US006954471B1

(12) United States Patent
Rousselin et al.

(10) Patent No.: US 6,954,471 B1
(45) Date of Patent: Oct. 11, 2005

(54) METHOD AND DEVICE OF GENERATION OF ONE REFERENCE EVENT FROM A FRAME OF INFORMATION

(75) Inventors: Samuel Rousselin, Rennes (FR); Philippe Le Bars, Nouvoitou (FR); Lionel Le Scolan, Rennes (FR); François Thoumy, Chevaigne (FR); Frédérique Ehrmann, Rennes (FR); Mohamed Braneci, Rennes (FR); Patrice Nezou, Bruz (FR); Pascal Rousseau, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1163 days.

(21) Appl. No.: 09/597,143

(22) Filed: Jun. 20, 2000

(30) Foreign Application Priority Data

Jun. 21, 1999 (FR) .................................. 99 07856

(51) Int. Cl.[7] .............................................. H04J 3/16
(52) U.S. Cl. ..................................................... 370/503
(58) Field of Search ................................ 370/503, 350, 370/205–210, 252, 254, 241, 243, 244, 245, 370/251, 512, 518, 506, 509; 375/355, 356, 375/359

(56) References Cited

U.S. PATENT DOCUMENTS 5,128,971 A     7/1992  Johnson ...................... 375/107
5,274,629 A *  12/1993  Helard et al. ................ 370/208
5,444,697 A     8/1995  Leung et al. ................... 370/19
5,638,379 A     6/1997  Narasimha et al. .......... 371/5.4
5,809,092 A     9/1998  Gontsch ....................... 375/356

FOREIGN PATENT DOCUMENTS

| EP | 0722233 A2 | 7/1996 |
| EP | 0 841 767 A1 | 5/1998 |
| EP | 0892335 A1 | 1/1999 |
| WO | WO 96/31033 | 10/1996 |

OTHER PUBLICATIONS

William D. Warner et al., OFDM/FM Frame Synchronization for Mobile Radio Data Communication, IEEE Transactions on Vehicular Technology, vol. 42, No. 3, Aug. 1993.
Takashi Sato, Philips Research Briarcliff, Synchronizing Cycle Master to External Timing Information via Cycle Slave, document dated Jan. 26, 1998.

* cited by examiner

*Primary Examiner*—Dang T Ton
(74) *Attorney, Agent, or Firm*—Fitzpatrick, Cella, Harper & Scinto

(57) ABSTRACT

The present invention concerns a method and an apparatus of generating a reference event in a receiving node receiving frames of information, when a frame of information is received, the method and the apparatus sample the frame of information in order to form sampled data, process sampled data in order to detect among said sampled data a specific data, monitor the number of processed sampled data until the detection of a specific data and generate a reference event according to the result of processing and monitoring.

33 Claims, 14 Drawing Sheets

Figure 1:
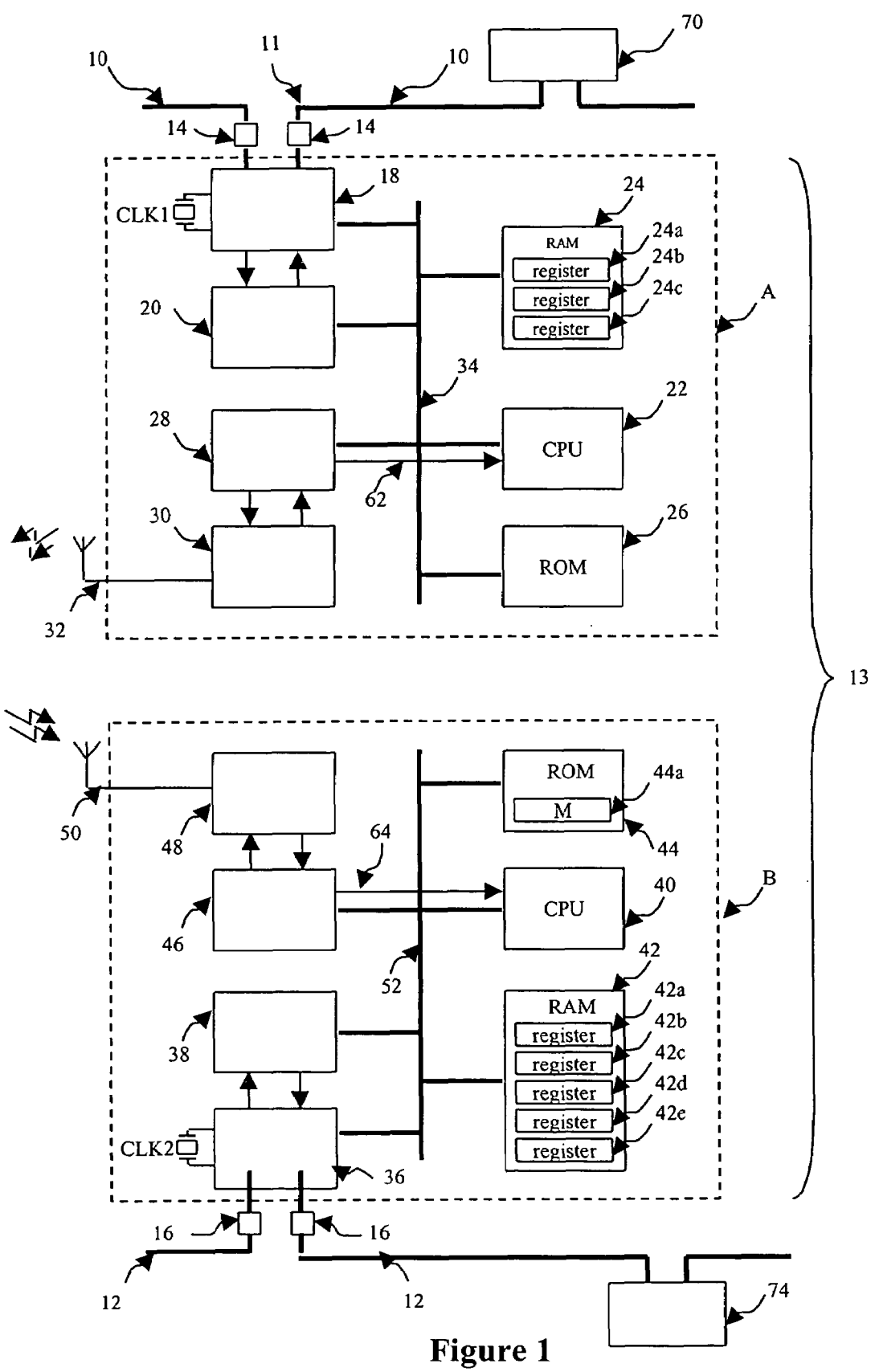

| Reference times (A) | tA | tA' | tA'' | ~~tA(3)~~ | tA(4) | ~~tA(5)~~ | ~~tA(6)~~ | tA(7) | ... |
|---|---|---|---|---|---|---|---|---|---|
| Reference times (B) | tB | tB' | tB'' | tB(3) | tB(4) | ~~tB(5)~~ | tB(6) | tB(7) | ... |
| Reference periods | ↕ | ↕ | ↕ | | ↕ | | | ↕ | ↕ |

Figure 7

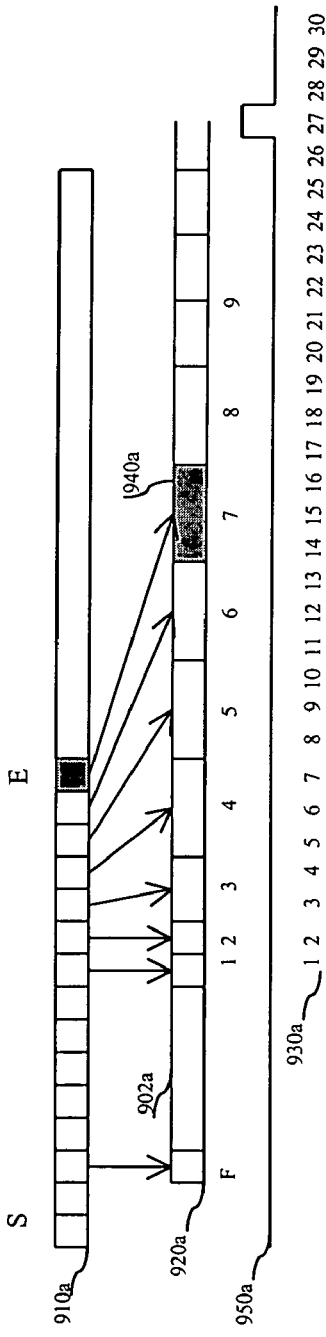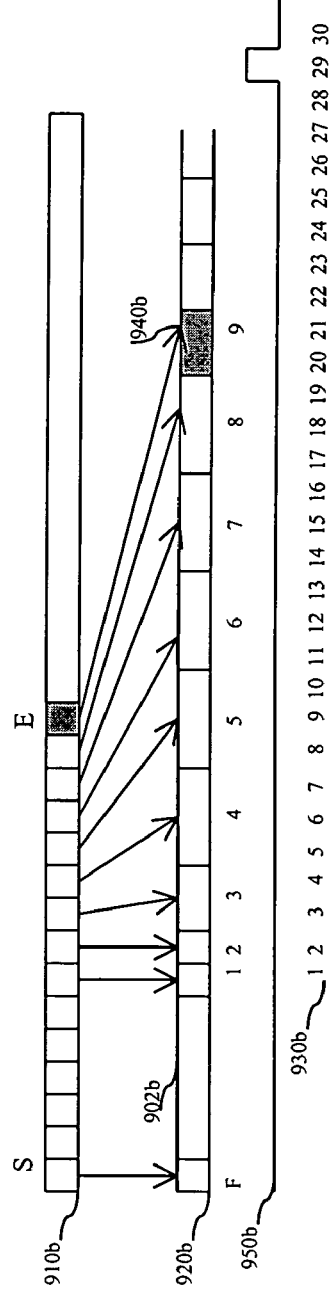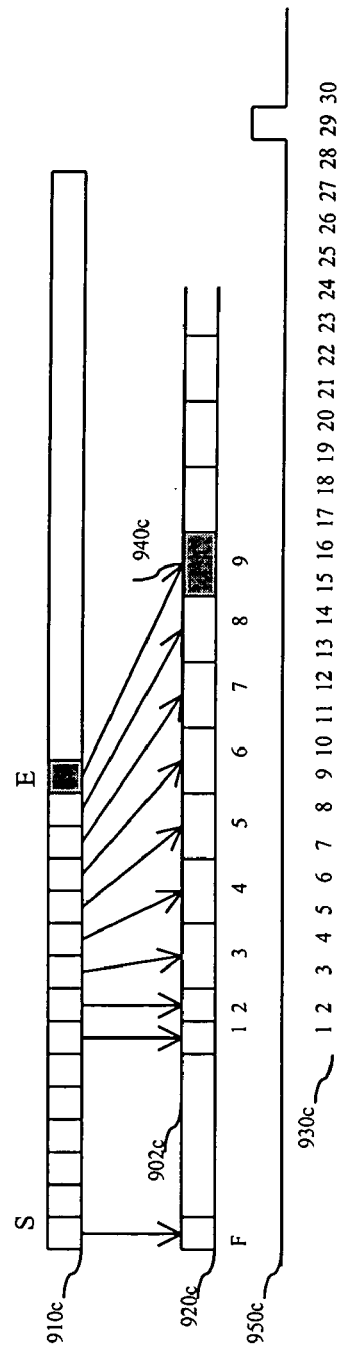

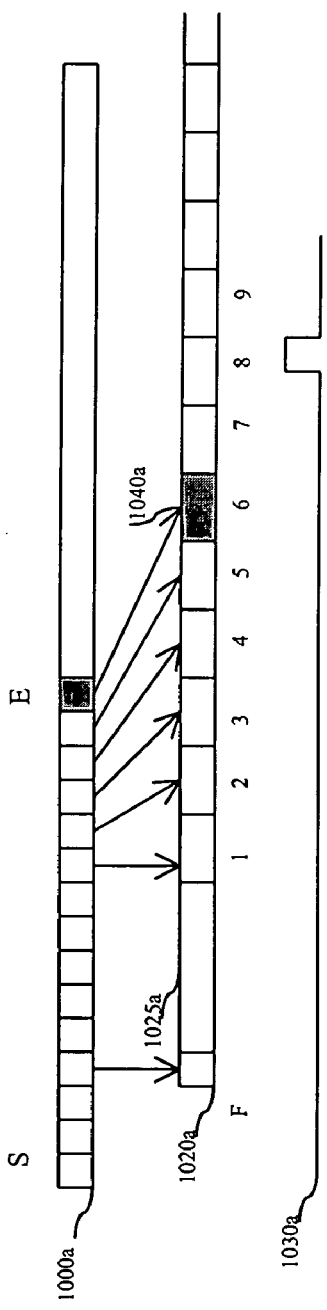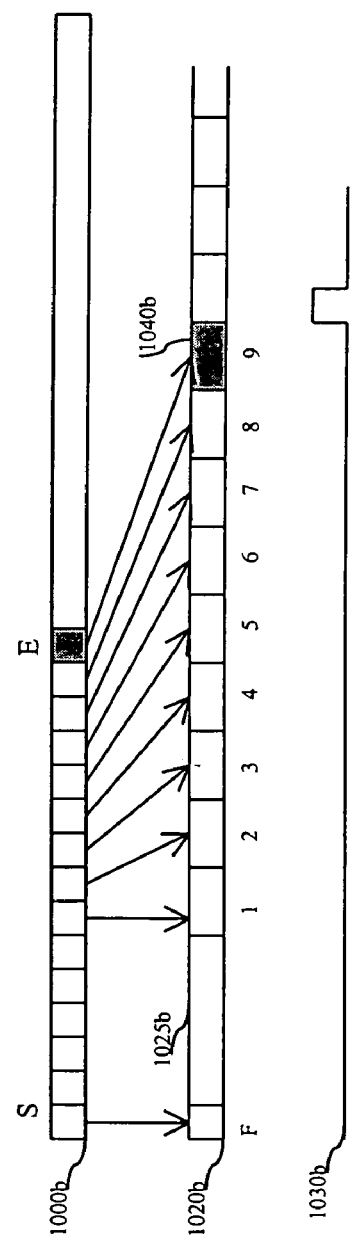

METHOD AND DEVICE OF GENERATION OF ONE REFERENCE EVENT FROM A FRAME OF INFORMATION

BACKGROUND OF THE INVENTION

Field of the Invention

The present invention concerns a method and an apparatus for the generation of a reference event from a specific data in a frame of information.

In the telecommunication area, data are transmitted from a transmitter to a receiver by frames of information. One frame of information is divided into two parts, a first part called preamble or header and a second part called data frame which contents data to be transmitted.

Generally, it is interesting for the receiver to be able to detect with some accuracy a reference event from a specific data in a frame of information.

As example, this reference moment can be used for synchronising the receiver on the transmitter, or activate on receiver side several operations which have to be done simultaneously.

More particularly, in the French patent application no. 9906029 not yet published, this application concerns the control of synchronisation in frequency between at least two nodes A, B of a communication network comprising each one a clock of given frequency.

This specification discloses a method of synchronisation between communication networks exchanging information by frame of information, each communication network having clock and the number of clock pulses is monitored by a counter. The synchronisation is made by reading information representing the counted clock pulses of the clock of the first network at the appearance of a reference event, inserting at least said information or calculated information on the basis of said information into the frame of information as the synchronisation information, transferring said frame of information from the first to the second network, reading information representing the number of counted clock pulse of the clock of the second network at the appearance of reference event, reading synchronisation information inserted in received frame of information from the first network, calculating a difference between information and synchronising the second network.

More precisely, the moment of appearance of the event of reference is related to the data received by the receiving node B and which are transmitted by node A, this moment being also called moment of reference.

In the above mentioned patent application it is proposed a method of determination of this moment of reference which is based on a method of autocorrelation carried out on a known sequence of data which is added to the beginning of a frame of data in order to detect the beginning of this one. But such autocorrelation technique is sensible to perturbation.

The present invention thus aims to remedy this problem by proposing a method of generating a reference event in a receiving node receiving frames of information. The method comprises the following steps executed when a frame of information is received:
  sampling the frame of information in order to form sampled data,
  processing sampled data in order to detect among said sampled data a specific data,
  monitoring the number of processed sampled data until the detection of a specific data,
  generating a reference event according to the result of monitoring steps.

Correlatively, the invention proposes an apparatus for generating a reference event in a receiving node receiving frames of information. The apparatus comprises:
  sampling means for sampling the frame of information in order to form sampled data,
  processing means for processing sampled data in order to detect among said sampled data a specific data,
  monitoring means for monitoring the number of processed sampled data until the detection of a specific data,
  generating means for generating a reference event according to the result of monitoring means.

By such way, the lost or highly corrupted data in the preamble have no influence on the generation of a reference event, such reference event is accurate.

According to a preferred embodiment, the method, further comprising a step of counting a sampling clock and once a specific data is detected, the step of generating a reference event comprises further steps of:
  adding the number of monitored processed sampled data to a predetermined value,
  generating a reference event when the counted sampling clock equals to the result of adding step.

Correlatively, the invention proposes an apparatus, further comprising counting means for counting a sampling clock and once a specific data is detected, the means for generating a reference event comprises further means of:
  adding means for adding the number of monitored processed sampled data to a predetermined value,
  generating means for a reference event when the counted sampling clock equals to the result of adding means.

By such way, long processing time for detecting a specific data has no influence on the accuracy of the moment of the generation of the reference event. Such reference event is generated the most rapidly as possible reducing by this way the size of buffer used.

The invention proposes also a method of synchronisation between communication networks exchanging information by frame of information, each communication network having clock and the number of clock pulses is monitored by a counter. The method comprises the following steps:
  reading information representing the counted clock pulses of the clock of the first network at the appearance of a reference event,
  inserting at least said information or calculated information on the basis of said information into the frame of information as the synchronisation information,
  transferring said frame of information from the first to the second network,
  sampling the received frame of information in order to form sampled data,
  processing sampled data in order to detect among said sampled data a specific data,
  monitoring the number of processed sampled data until the detection of a specific data,
  generating a reference event according to the result of monitoring steps,
  reading information representing the number of counted clock pulse of the clock of the second network at the appearance of reference event,
  reading synchronisation information inserted in received frame of information from the first network,
  calculating a difference between information,
  synchronising the second network.

Correlatively, the invention proposes a system of synchronisation between communication networks exchanging information by frame of informations, each communication network having clock and the number of clock pulses is monitored by a counter. The system comprises the following means:

reading means for reading information representing the counted clock pulses of the clock of the first network at the appearance of a reference event, inserting means for inserting at least said information or calculated information on the basis of said information into the frame of information as the synchronisation information, transferring means for transferring said frame of information from the first to the second network, sampling means for sampling the received frame of information in order to form sampled data, processing means for processing sampled data in order to detect among said sampled data a specific data, monitoring means for monitoring the number of processed sampled data until the detection of a specific data, generating means for generating a reference event according to the result of monitoring means, reading means for reading information representing the number of counted clock pulse of the clock of the second network at the appearance of reference event, reading synchronisation information inserted in received frame of information from the first network, calculating means for calculating a difference between read information, synchronising means for synchronising the second network.

By this way, no packets are lost between the two networks, which is important for the transfer of certain data, no large memory used for buffering data is required if networks are not synchronised. By taking the number of counted clock pulses of two networks, we can easily synchronise one network to the second. The reference event permit to keep track of the moment these numbers have been taken avoiding problem generated by delay of transmission and processing time. A difference calculation is also an easy way to evaluate unsynchronisations between two networks. The insertion of synchronisation information into data frames does need to generate special synchronisation signals among network and simplifies the configuration of interconnected networks. The processing time mentioned above, which represents the time to recover the synchronisation information into the data frame has no effect on the accuracy of the synchronisation of the networks.

The invention also concerns a program stored in a memory medium in an apparatus for generating a reference event in a receiving node receiving frames of information. The program comprises:

code for sampling the frame of information in order to form sampled data, code for processing sampled data in order to detect among said sampled data a specific data, code for monitoring the number of processed sampled data until the detection of a specific data, code for generating a reference event according to the result of monitoring code.

The invention also concerns an apparatus for generating a reference event in a receiving node receiving frames of information. The apparatus comprises:

a processor for sampling the frame of information in order to form sampled data, for processing sampled data in order to detect among said sampled data a specific data, for monitoring the number of processed sampled data until the detection of a specific data and for generating a reference event according to the result of monitoring operations.

The invention also relates to an interface for receiving the instructions of a computer program, characterised in that it makes it possible to implement the synchronisation checking method as briefly disclosed above.

Figure 2A:
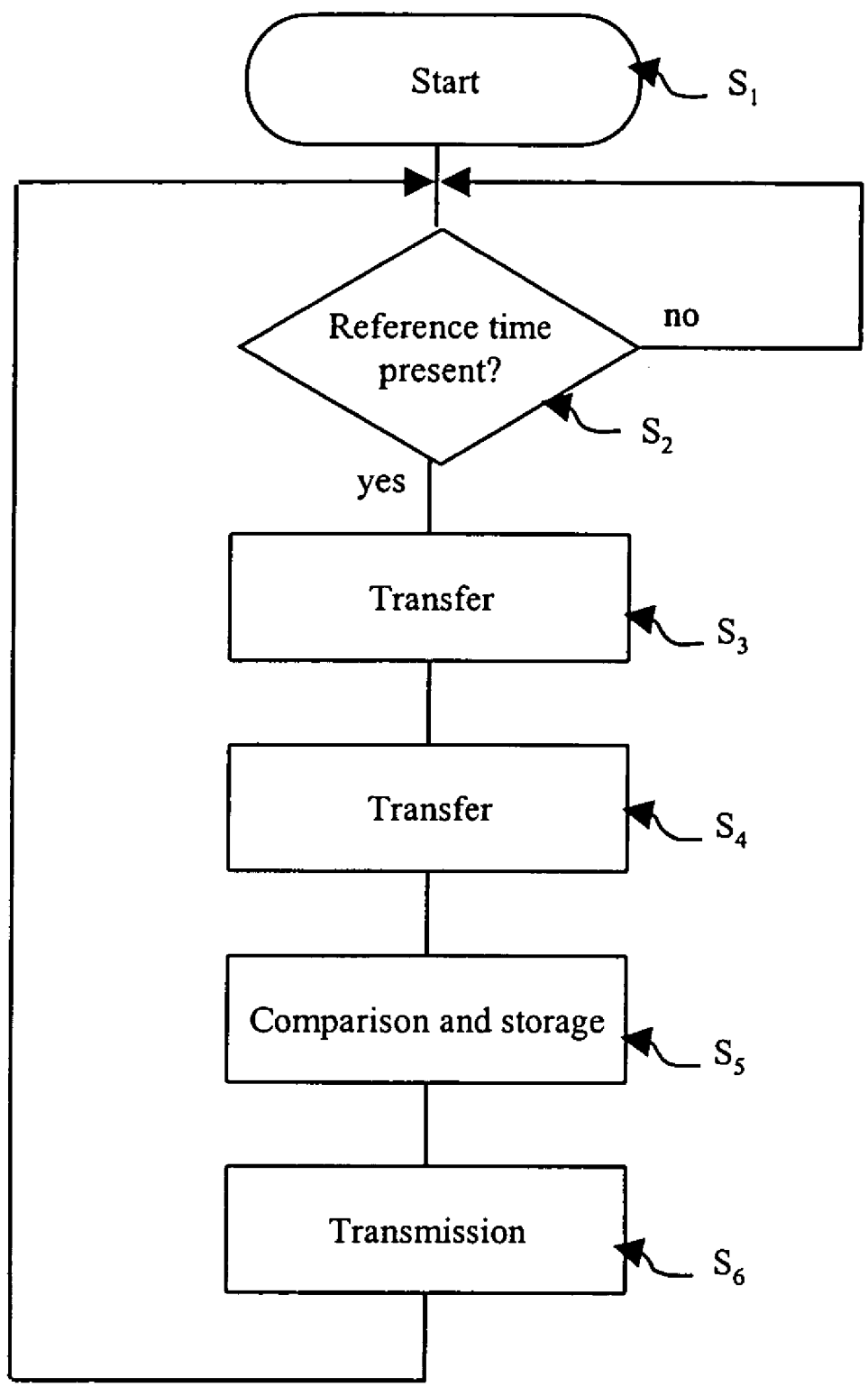
Figure 2B:
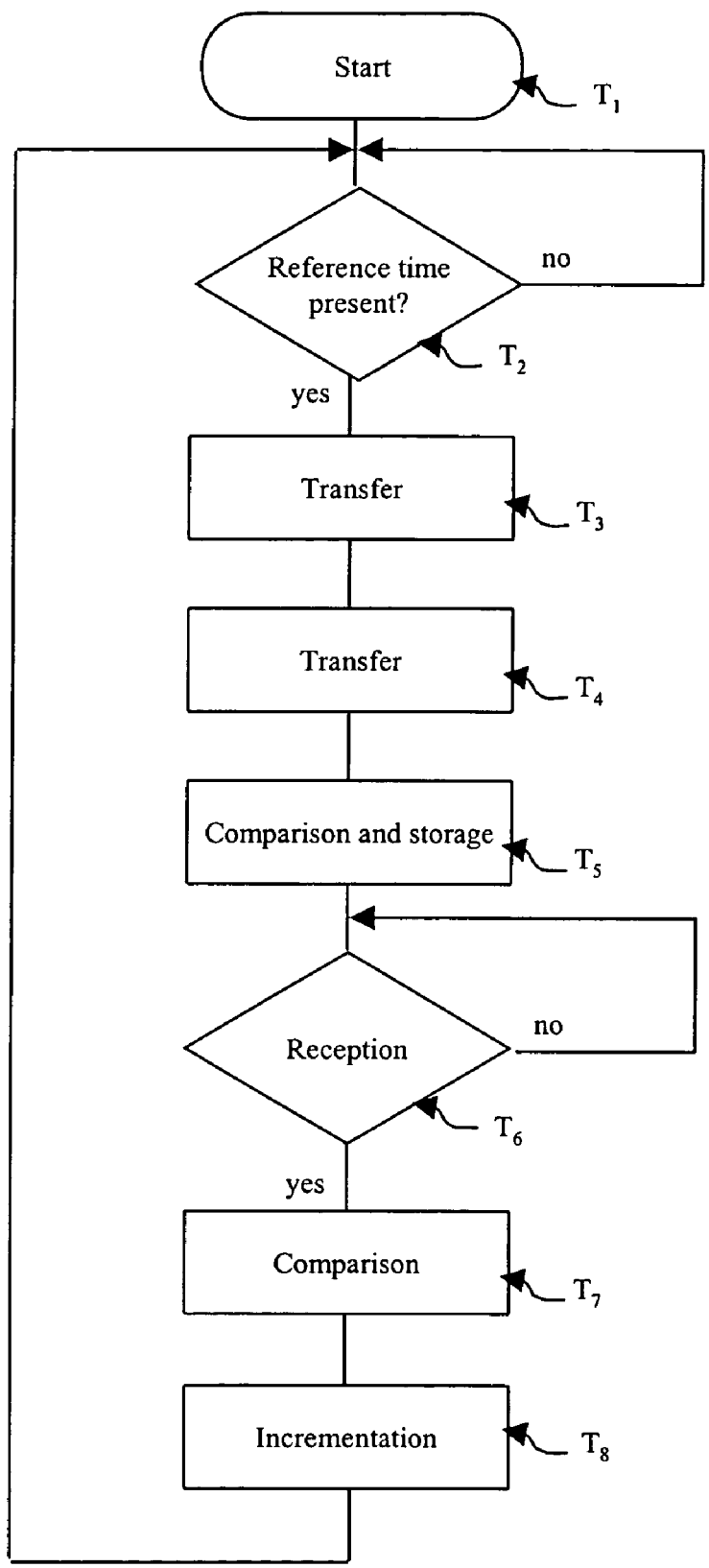
Figure 3:
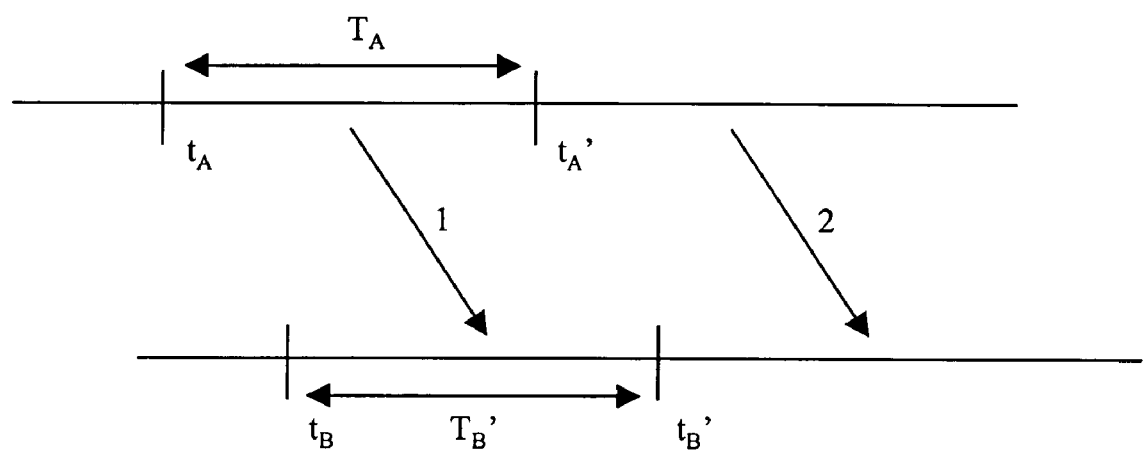
Figure 4:
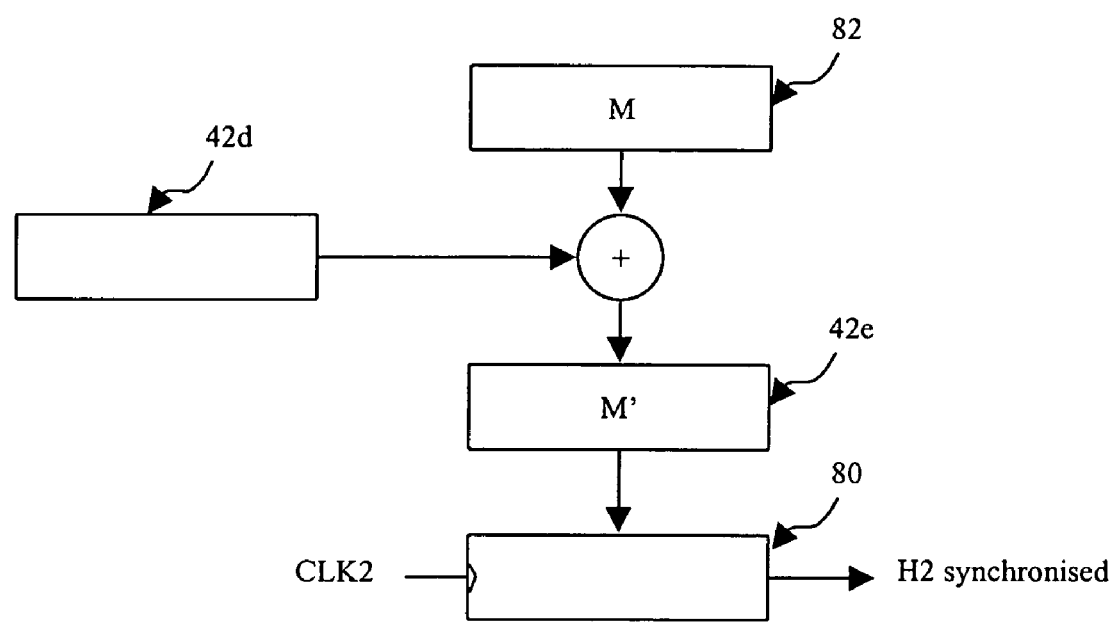
Figure 5:
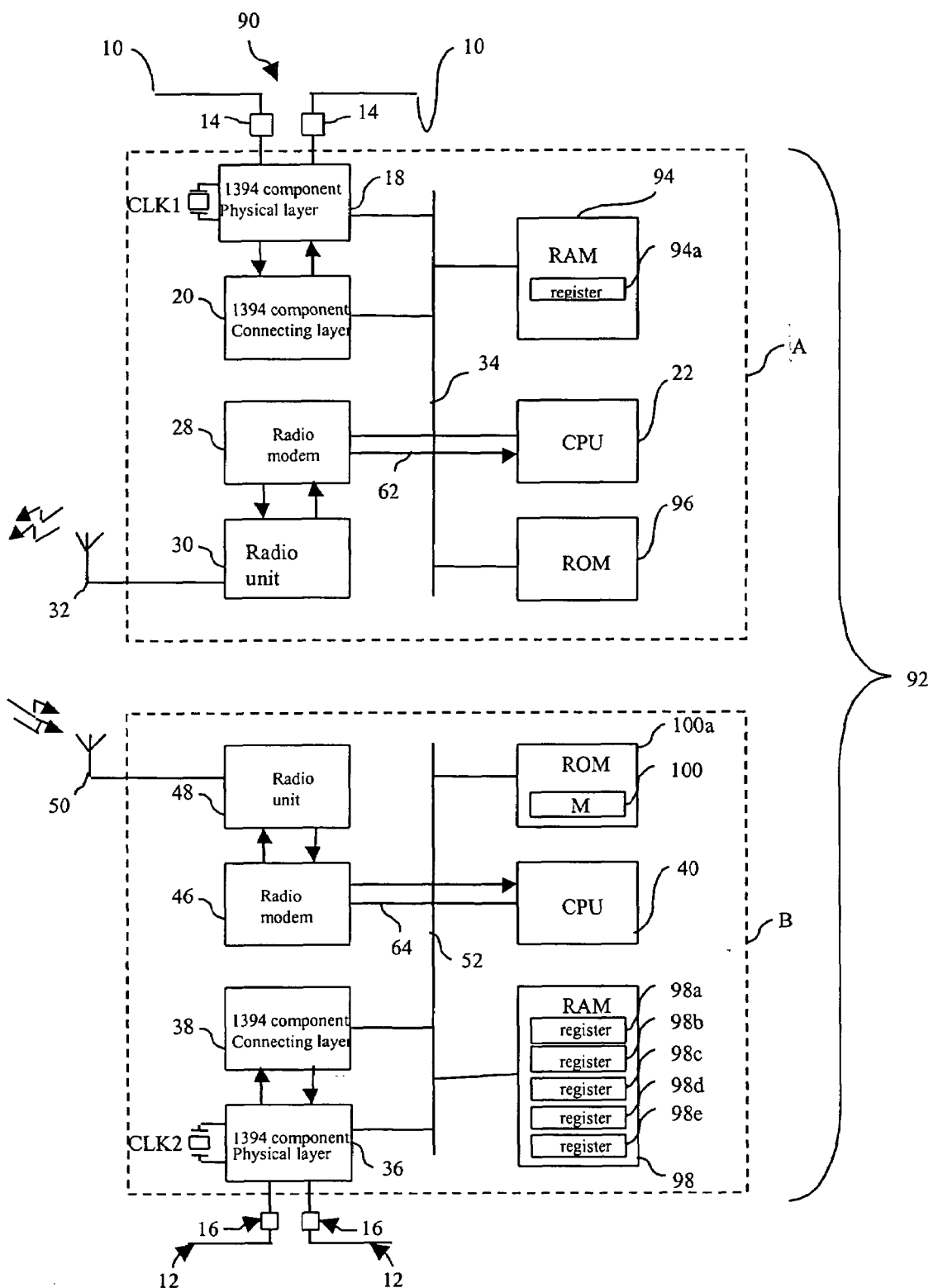
Figure 6A:
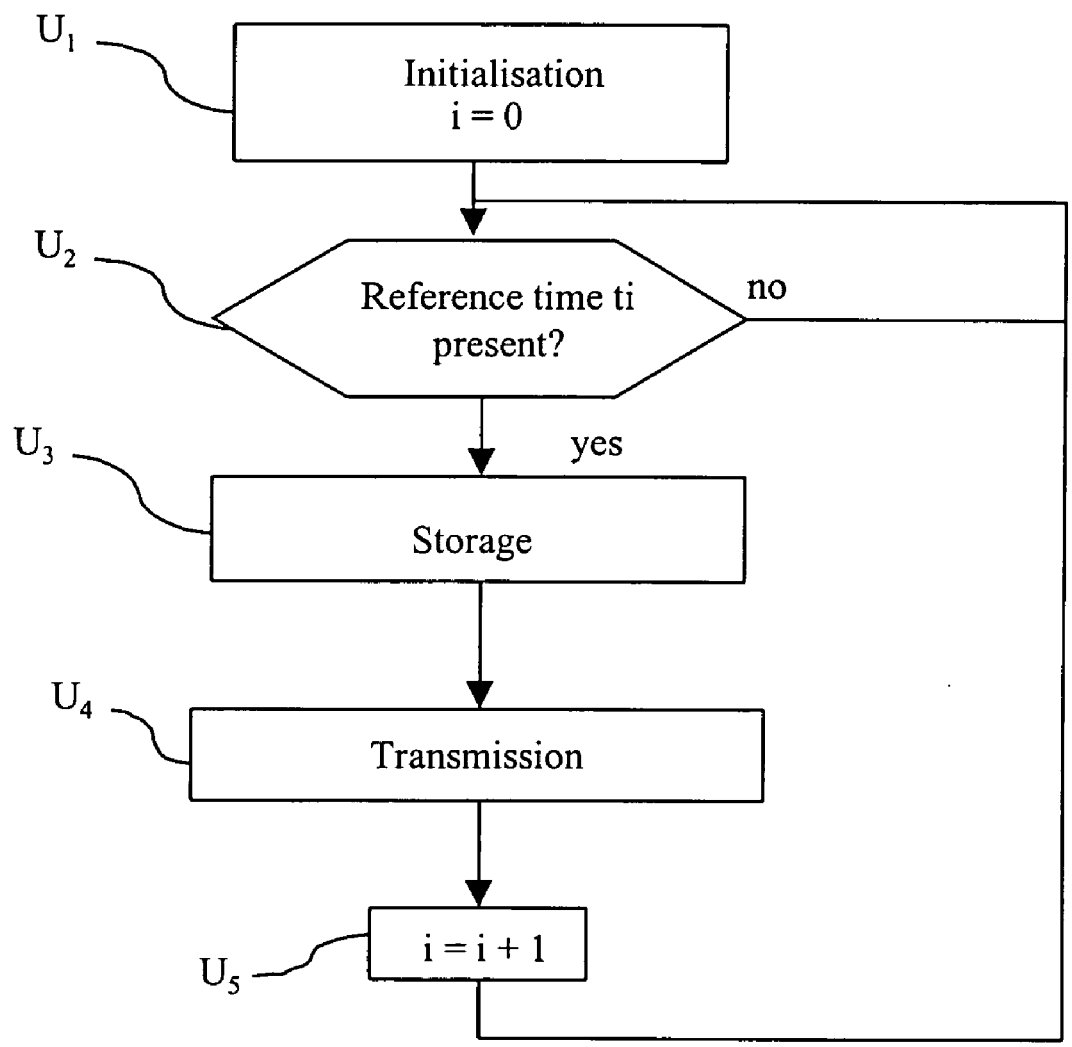
Figure 6B:
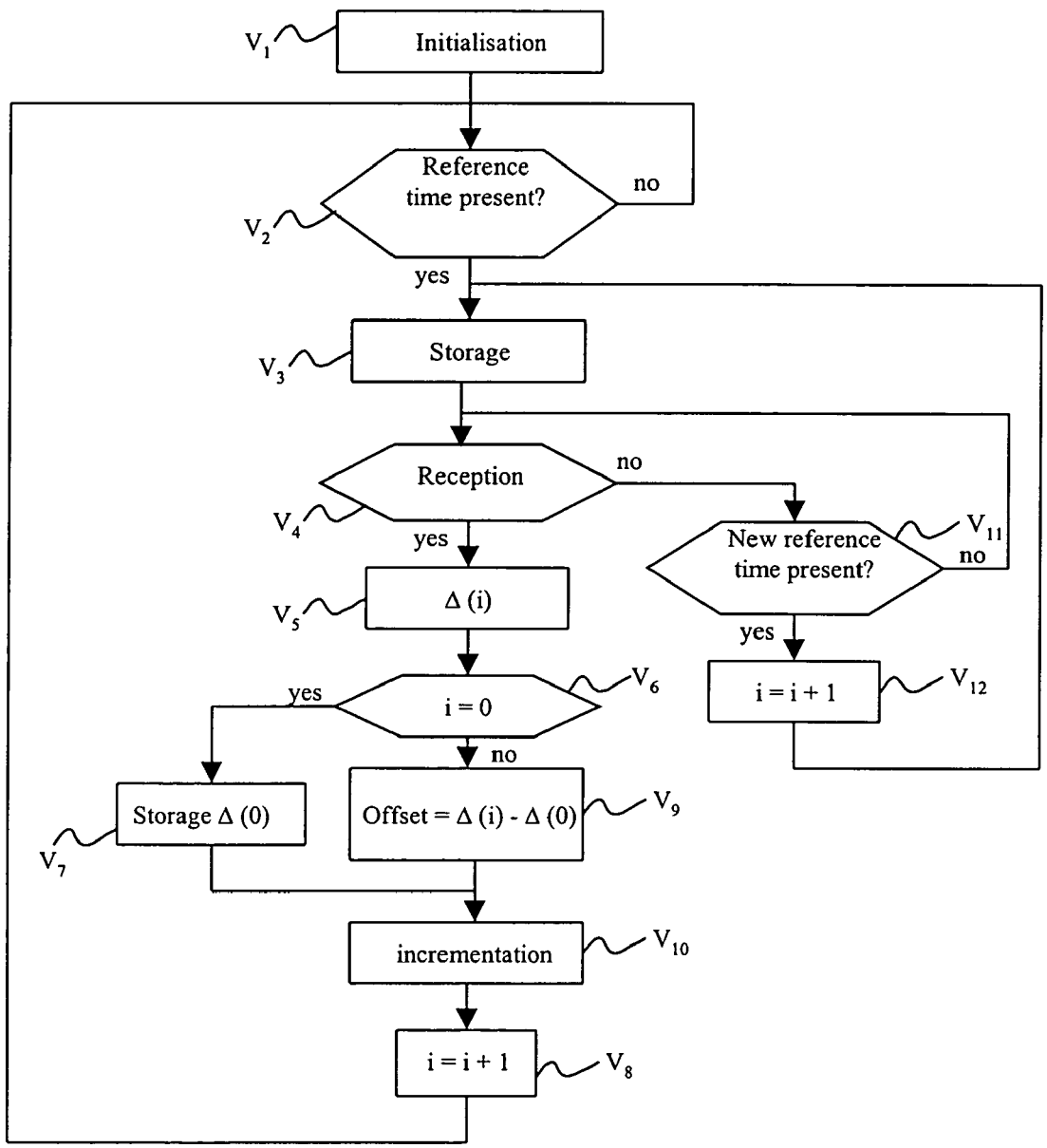
Figure 8:
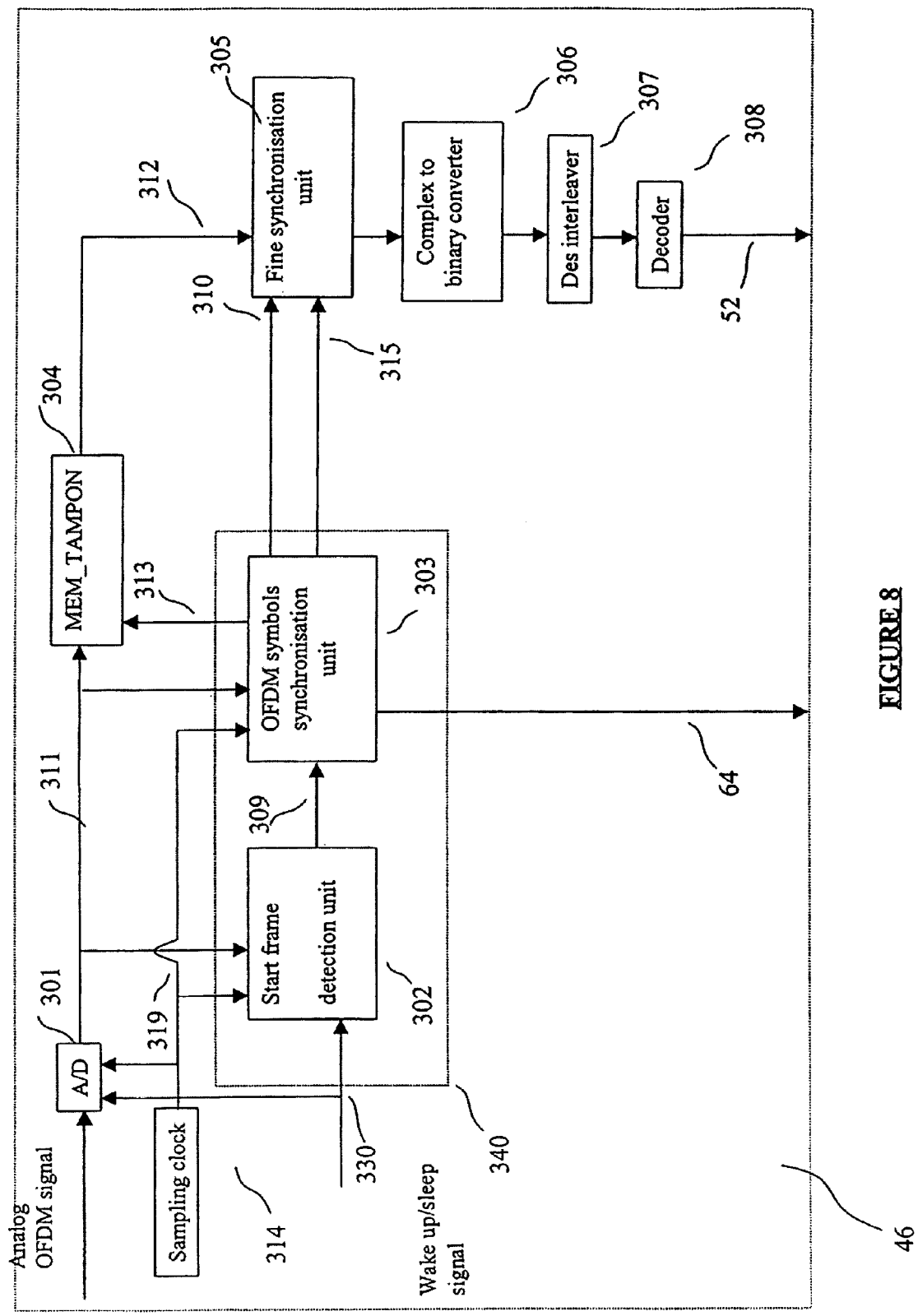
Figure 9:
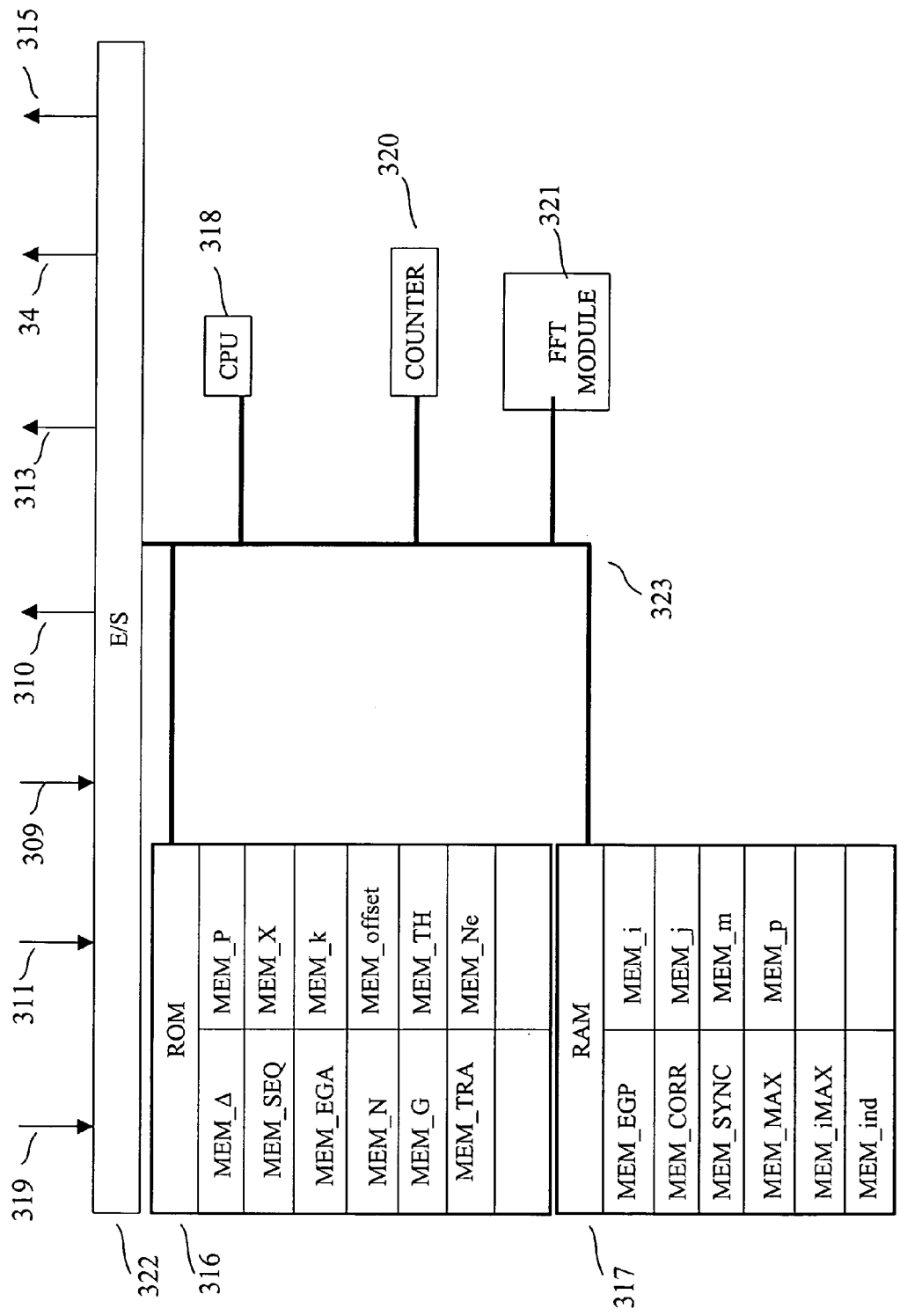
Figure 10:
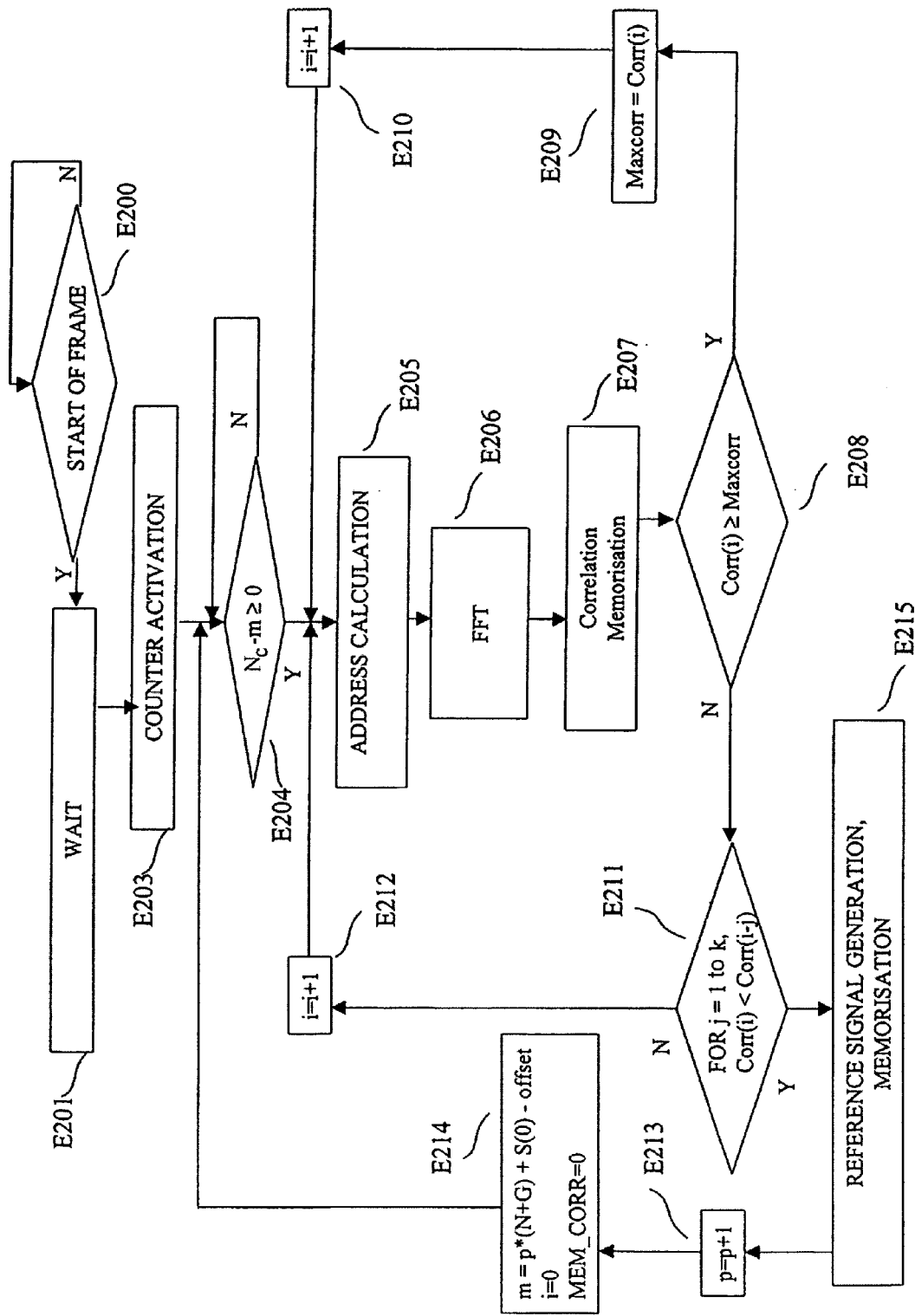

Other characteristics and advantages will emerge during the following description, given solely by way of non-limitative example and made with reference to the accompanying drawings in which:

FIG. 1 is a view of a communication network according to a first embodiment of the invention, using a radio bridge 13 consisting of nodes A and B, FIG. 2a depicts the algorithm of the synchronisation checking method according to a first embodiment of the invention, implemented at the node A of FIG. 1, FIG. 2b depicts an algorithm for the synchronisation checking method according to a first embodiment of the invention, implemented at the node B of FIG. 1, FIG. 3 illustrates schematically the principle implemented in the first embodiment of the invention, FIG. 4 is a schematic view of the different functional blocks used for synchronising a clock signal H2 with respect to a clock signal H1, FIG. 5 is a general schematic view of a communication network according to a second embodiment of the invention, using a radio bridge 92 consisting of nodes A and B, FIG. 6a depicts an algorithm of the synchronisation checking method according to a second embodiment of the invention, implemented at the node A of FIG. 5, FIG. 6b is an algorithm of the synchronisation checking method according to a second embodiment of the invention, implemented at the node B of FIG. 5, FIG. 7 is a table depicting the different reference times at the nodes A and B depicted in FIG. 5 and the corresponding reference period, FIG. 8 is a detailed schematic view of the modem 46 drawn in FIGS. 1 and 5, FIG. 9 is a detailed schematic view of a device for the determination of a reference moment described in FIG. 8, FIG. 10 is a flowchart of the algorithm used by the device described in FIG. 9 in order to realise the invention, FIGS. 11a, 11b, 11c describe timing diagrams according to the invention, FIGS. 12a and 12b show a second embodiment according to our invention.

The invention is particularly advantageous in networks consisting of serial communication buses in accordance with IEEE 1394 standard.

The invention more particularly makes possible the interconnection of two serial communication buses in accordance with IEEE 1394 through a radio bridge.

IEEE 1394 defines a rapid serial link which makes possible the connection of a device to a bus in accordance with this standard, to convey asynchronous and isochronous traffic on said bus.

The transmission of isochronous traffic on a 1394 serial communication bus is based on a network clock of 8 kHz which defines cycles with a duration of 125 $\mu$s.

Each node or station uses an internal clock in order to generate such cycles and can transmit data over the bus during the cycle. Amongst all the nodes connected to the bus, one of them is considered to be a reference for all the others and is referred to as the "cycle master".

This node or station, denoted CM, synchronises all the clocks of the other nodes or stations with respect to its own clock.

In a communication network consisting of two or more serial communication buses in accordance with IEEE 1394, when several buses are connected by means of bridges, one of the nodes or stations CM amongst all these buses is chosen as a reference for the entire network.

This means that the clock of the reference node or station referred to as the "network cycle master" generates a reference clock for the entire network, the clocks of the nodes or stations denoted CM of the other buses in the network then have to synchronise themselves with respect to the clock of the network cycle master.

For a better understanding of the invention, only the connection of two serial communication buses in accordance with IEEE 1394 and denoted 10 and 12 of FIG. 1 will be considered. Such connection is made by two nodes or stations denoted A and B, connected together by a radio link.

Nodes A and B can be far from each other. They may be two different data processing appliances chosen from amongst the following appliances: printer, server, computer, facsimile machine, scanner, video tape recorder, decoder (or set top box), television receiver, telephone, audio/video player, camcorder, digital camera or digital photographic apparatus.

These two nodes or stations form what is referred to as a radio bridge, denoted 13, and interconnect the two buses which form part of a communication network according to the invention, denoted 11.

The bridge 13 in some way provides the interface between the buses 10 and 12.

It should be noted that nodes A and B can, as an alternative, be connected together by an optical, cabled etc. link.

In this first embodiment of the invention, the nodes or stations A and B are the cycle masters of the respective buses 10 and 12.

It could be considered also that one of the apparatus 70 or 74 each connected on their respective buses 10 and 12 are the cycle masters of the respective buses 10 and 12.

In this example, the bus denoted 10 is the "master" bus, whilst the bus denoted 12 is the "slave" bus.

It will be noted that an internal oscillator or clock denoted CLK1 generates a clock signal denoted H1 at the master bus and an internal oscillator or clock denoted CLK2 generates, at the slave bus, a clock signal denoted H2.

Each of the internal oscillators or clocks system is capable of delivering a frequency equal to 24.576 MHz with a tolerance of 100 ppm.

On FIG. 1, the node denoted A considered to be the radio transmitter is connected to the serial communication bus 10 by connectors 14.

The node denoted B and considered to be the radio receiver is connected to the serial communication bus 12 by connectors 16.

The node A has a 1394 physical interface circuit denoted 18 and a circuit fulfilling the functions of the 1394 connection layer denoted 20.

Such circuits consist for example of a component PHY TSB21 LV03A and a component LINK TSB 12LV01A sold by the company Texas Instruments.

The node A has also a calculation unit 22, a temporary storage means of the RAM type denoted 24, containing several registers denoted 24a to 24c, and a permanent storage means denoted 26.

As depicted in FIG. 1, the node A has a radio modem 28 connected to a radio unit 30 which has a radio antenna 32.

A local bus denoted 34 connects the different elements of the node A together.

In a similar fashion to what has been described for node A, node B has a 1394 physical interface circuit denoted 36, a circuit fulfilling the functions of the 1394 physical layer denoted 38, a calculation unit CPU denoted 40, a temporary storage means of the RAM type denoted 42 containing several registers 42a to 42e, a permanent storage means 44 containing a register 44a, and the program implementing the method of synchronisation among 2 network. Node B has also a radio modem 46 connected to a radio unit 48 which has a radio antenna 50.

A local bus denoted 52 connects all these elements together.

As indicated in FIG. 1, each physical interface circuit 18 for the node A and 36 for the node B works with a clock or internal oscillator, CLK1 for node A and CLK2 for node B.

FIGS. 2a and 2b describe respectively the different steps of the method according to the first embodiment of the invention which are implemented at the transmitter node A and receiver node B. These figures depict different instructions of a computer program stored, for the algorithm of FIG. 2a, in the storage means 26 of the node A and, for the algorithm of FIG. 2b, in the storage means 44 of the node B.

The synchronisation method according to the first embodiment of the invention will now be described with reference to FIGS. 1, 2b and 2c.

This method is based on the determination of a reference moment to generate a reference event from a received frame of information on a receiving node which will be described later on with reference to FIGS. 8 to 10.

In the node and especially in the circuit 18 of FIG. 1, a counter is incremented continuously with the internal oscillator or clock CLK1.

The size of this counter is K bits and its period is therefore $2^K$.

The present invention uses the concept of reference moment and reference event, the reference moment identifying the appearance of a reference event at one of the nodes A and B. For example, the reference event under consideration is the start of a data frame transmitted between nodes A and B, and the reference moment corresponds to the time when this frame begins.

More precisely, the reference moment at the node A marks the time of the start of transmission of the data frame whilst the reference moment of the node B marks the time of the generation by the modem of a reference event based on the reception of this same data frame.

It should be noted that the determination of a reference moment in the transmitter is easy to realise because transmitter itself manages the generation of the information frame.

For the receiver the determination of a reference moment is more complex and will be explained later in reference to FIGS. 8 to 10.

However, the reference moment can be different for the transmitter and the receiver. The start of the data frame can be a reference event for the transmitter and the reference event can be for the receiver the start of the data frame delayed by a certain time. The description of the determination of the reference event and the generation of a reference time will be disclosed later with reference to FIGS. 8 to 10.

It should be noted that, if the clocks CLK1 and CLK2 are synchronised (same frequency), then the contents of the counters determining the two reference moments will present a shift which will remain constant over time.

If on the other hand the clocks are not synchronous, then the shift between the contents of the counters mentioned above will no longer be constant, and the present invention is based on the variation in this shift in order to measure the deviation between the clocks CLK1 and CLK2.

Naturally, the reference moment can correspond to any other event on which the transmitter and receiver must synchronise.

It should be noted that the appearance of the reference events is not necessarily periodic.

In order to detect the start of a data frame, both in the node A and in the node B, the radio modems of each node, denoted respectively 28 and 46, use appropriate synchronisation sequences. For example, a sequence known to the transmitter and receiver is added at the start of each frame. When the start of a frame is detected at each node, a signal 62 (node A), 64 (node B) is sent to the calculation unit CPU, respectively 22 (node A), 40 (node B), this signal indicating a reference moment (FIG. 1).

Each time a reference moment is determined for example at the node A (step $S_1$), the reference moment being denoted tA, the content of the counter is saved in a register denoted 24a of the temporary storage means 24 of FIG. 1.

The above content of this register 24a is transferred into a second register 24b of the storage means 24 (step $S_3$).

The two registers thus make possible to save the value of the counter at the last two reference moments, for example denoted tA and tA', which both correspond to the time of start of transmission of two consecutive data frames.

Each reference moment, a value that represents said reference moment is stored in one of the registers 24a, 24b of the temporary storage means 24 of FIG. 1.

It should be noted that each reference value stored in the registers 24a and 24b corresponds, for example, to a number of clock pulses generated by the clock CLK1 calculated modulo $2^K$.

All the operations (addition, subtraction, counting) are performed modulo 2 raised to the power of the size of the corresponding registers or counters. In addition, it is assumed that the result of the subtraction contains a sign bit.

After the transfer of the content of the register 24a to the register 24b (step $S_3$) and of the content of the counter to the register 24a (step $S_4$), the difference between the reference values stored in these two registers is calculated by the CPU 22 (step $S_5$). This difference corresponds to a first item of information representing an elapsed period of time, at the node A, between the reference moments tA and tA'.

This first item of information is stored in the register denoted 24c in FIG. 1. This register therefore contains the duration of a reference period counted in numbers of pulses of the clock or internal oscillator CLK1.

The first item of information representing the time elapsed between the two reference moments tA and tA' and which is stored in the register 24c is transmitted from the node A (transmitter) to the node B (receiver) using the data frame transmitted as from the reference moment tA' (step $S_6$).

The transmission step is performed by the radio equipment consisting of the elements 28, 30 and 32 of the node A, whilst the reception step at the node B uses the elements 46, 48 and 50 of said node B.

In a similar fashion to that which was described for the node A (the transmitter), a second item of information representing a time elapsed between two reference moments tB and tB' is then calculated at the node B (the receiver).

These two reference moments tB and tB' correspond to the reference moment of the generation of reference event based on the start of the data frames transmitted by the node A and for which the reference moments tA and tA' were determined at said node A.

In the device 36 included in node B, a counter is incremented continuously with the internal oscillator or clock CLK2.

The size of this counter is K bits and its period is therefore equal to $2^K$.

Each time a reference moment tB or tB' is determined (step $T_2$, FIG. 2b), as indicated above, a reference value representing this reference moment is stored in the register 42a of the temporary storage means 42 of FIG. 1.

Thus the reference value corresponding to the reference moment tB is stored in the register 42a and then transferred into the register 42b (step $T_3$) when the second reference moment tB' is determined (step $T_2$) and when the corresponding reference value is transferred from the counter of the device 36 into the register 42a (step $T_4$).

The second item of information representing the time elapsed between the two reference moments tB and tB' is calculated by the CPU 40 (step $T_5$), and the difference formed between the two reference values stored in the registers 42a and 42b and identifying the two reference moments tB and tB' is then stored in a register 42c of the permanent storage means 42 of FIG. 1.

It should be noted that each reference value contained in one of the aforementioned registers corresponds to a number of so-called clock pulses that are emitted by the clock or internal oscillator CLK2 of the node B.

It should be noted that the reference event associated with a data frame received by the node B (receiver) corresponds at this node to a signal generated by the modem based on the start of reception of said data frame.

The first item of information stored in the register 24c is received by the node B (step $T_6$).

If on the other hand no information is received by the node B, then the method according to the invention makes provision for once again starting to await reception of information transmitted by the node A with a data frame.

A comparison between the first and second items of information is made by the CPU 40 at step $T_7$.

If the number of clock pulses is denoted N, the first and second items of information are written respectively N(tA')−N(tA) and N(tB')−N(tB).

Any difference that can be detected between these two values represents the number of deviation clock pulses between the oscillators or clocks CLK1 or CLK2 during the reference period considered.

It is thus possible, knowing the deviation between the clocks CLK1 and CLK2 during the reference period, to correct the frequency of the signal H2 in order to synchronise H2 with H1.

If a difference is detected between these first and second items of information, the result obtained (the deviation) is added to the content of a register denoted 42d of the temporary storage means 42 of FIG. 1 (step $T_8$).

This register 42d contains the total of the different deviations measured during all the reference periods that have been taken into account.

As depicted in FIG. 3, two axes indicate respectively for the node A and for the node B the reference moments corresponding to two data frames transmitted from the node A to the node B and marked by the arrows 1 and 2 in this figure.

Thus, at the node A, the first item of information representing the time elapsed between the first two reference moments tA and tA' is indicated by the letter $T_A$, whilst at the node B, the second item of information representing the timing elapsed between the other two reference moments tB and tB' is indicated by the letter $T_B$.

As a variant, it should be noted that it would be entirely possible to transmit the second value $T_B$ from the node B to the node A instead of transmitting the first value $T_A$ from the node A to the node B.

In this case, node B constitutes the reference (Master) for node A (Slave).

When two items of information each representing the clock of the node under consideration are compared with each other, as explained before, the number of significant bits of the difference between these depends on the deviation between the two clocks and the duration of the reference period.

For example, two oscillators are taken whose clock frequencies are respectively 24.576 MHz−100 ppm and 24.576 MHz+100 ppm and a reference period of 1 ms, the difference detected between the two reference periods is approximately five clock pulses, which can be coded using three bits.

Thus the sizing of the registers at 1 byte, where one bit will be reserved for the sign, seems to be a sufficient choice.

This sizing of the registers concerns the registers denoted 24c, 42c and 42d of FIG. 1.

The optimisation of the size of these registers and particularly of the register 42d is important given that it defines the bandwidth needed for transmitting the data over the radio link between nodes A and B.

Normally, when no deviation exists between the internal clocks CLK1 and CLK2, the first and second items of information each representing the time elapsed between the two reference moments respectively tA, tA' and tB, tB' are equal.

However, when a deviation exists and is stored in the register 42d, a synchronisation is necessary.

It should be noted that, in this case, it is the clock signal H1 that constitutes the reference.

The signal H2 can of course also constitute a reference with respect to which the clock signal H1 would be corrected.

The method according to the invention makes provision, in the case of a correction for synchronisation, for shortening or lengthening one or more periods of the clock signal H2 by a period equivalent to the number of clock pulses which are contained in the register 42d, and which represent the deviation noted between CLK1 and CLK2.

The distribution of the correction over several periods may be dictated, for example, by technical constraints: the impossibility of correcting more than one clock pulse per period, or the necessity of avoiding an abrupt variation in a given period.

It can even be envisaged to wait before making a correction in order, for example, to be able to benefit from an automatic compensation at certain buses in the network vis-à-vis the changes.

As example, FIG. 4 is a functional diagram illustrating the correction of the clock signal H2 with respect to the clock signal H1 when a deviation between the clocks or oscillators CLK1 or CLK2 is detected.

As depicted in FIG. 4, the clock signal H2 corrected or synchronised according to the method of the invention is generated from the clock or oscillator CLK2 using a counter denoted 80 included in the unit 36.

The period of this counter is fixed by loading a value M' contained in a register denoted 42 of the temporary storage means 42 of FIG. 1.

This value M' is an integer which corresponds to the division factor of the frequency of the clock CLK2 in order to obtain the frequency of the corrected or synchronised clock signal H2.

Moreover, another register denoted 82 contains the nominal division factor M between the frequencies of the clock CLK2 and of the clock signal H2 before correction.

In addition, the register 42d depicted on the left in FIG. 4 contains the total deviation denoted $\Delta_c$ between the clocks or oscillators CLK1 and CLK2.

Thus the period of the counter 80 is corrected with the total deviation $\Delta_c$ supplied by the register 42d by means of the following formula: $M'=M+\Delta_c$.

It should be noted that this deviation $\Delta_c$ could be of positive or negative sign. When the deviation is of positive sign, M' will be equal to M plus the absolute value of $\Delta_c$. The period of the counter 80 will then be increased, and the frequency of H2 will be decreased.

When the deviation is of negative sign, M' will be equal to M minus the absolute value of $\Delta_c$. The period of the counter 80 will then be decreased and the frequency of H2 will then be increased.

For the total deviation $\Delta_c$ to be taken into account in the correction of the period of the counter, it is necessary that this deviation is kept in the register 42d until the end of the current period of the counter. The register 42d must then be reset to zero during the following period and before the end thereof in order to avoid the same deviation being corrected twice.

If the correction of the deviation must be distributed over several periods, an intermediate register is necessary for containing the correction to be made to each period. After each correction, the register 42d containing the total deviation is decremented accordingly. The corrections are then made until the content of the register 42d is cancelled out.

FIG. 5 illustrates a second embodiment of the invention.

In this figure, the elements which are not modified with respect to those of FIG. 1 keep the same references as in the latter.

As depicted in FIG. 5, the communication network 90 according to the invention has a radio bridge denoted 92 which interconnects the serial communication buses in accordance with IEEE 1394 denoted 10 and 12 and the radio bridge is used as an interface between them.

The bridge 92 has two stations or nodes denoted A and B and which are respectively a radio transmitter (node A) and a radio receiver (node B).

These nodes A and B are different from those of FIG. 1 by their permanent and temporary storage means.

The node A has a temporary storage means RAM denoted 94 including a register 94a and a permanent storage means ROM denoted 96.

The permanent storage means 96 contains the computer program, the various instructions of which correspond to the steps of the method according to the second embodiment and which is implemented at the transmitter (node A).

The algorithm corresponding to this computer program is depicted in FIG. 6a.

In addition, the node B has a temporary storage means denoted 98 including the registers 98a to 98e and a permanent storage means ROM denoted 100 and which includes a register 100a.

This storage means 100 also contains the different instructions of the computer program making it possible to implement the method according to the second embodiment at the receiver (node B).

The algorithm corresponding to this computer program is depicted in FIG. 6b.

As indicated above, each of the nodes A and B has a 1394 physical interface circuit, a circuit fulfilling the functions of the 1394 connecting layer, a calculation unit, a radio modem connected to a radio unit which is equipped with a radio antenna, and a local bus connecting together the various elements of said node.

The method according to a second embodiment of the invention will now be described with reference to FIGS. 5, 6a, 6b and 7.

In node A depicted in FIG. 5, a counter included in the 1394 physical interface circuit 18 is incremented continuously with the internal oscillator or clock CLK1.

The size of this counter is K bits and its period is therefore $2^k$.

Everything stated previously with reference to FIGS. 1 to 4, concerning notably the reference moments, the reference events and the reference values, remains valid for this second embodiment.

The reference moments are determined in the same way as indicated above with reference to FIG. 1.

Thus, during step $U_1$, the initialisation of the variable i to the value 0 is done.

Each time a reference moment is determined at the node A (step $U_2$ FIG. 6a), the reference moment being denoted tA, the content of the counter included in the physical interface circuit 18 is saved in the register 94a of the temporary storage means 94.

To each given reference moment there corresponds a given reference value which represents said reference moment and which is for example equal to a number of clock pulses N emitted by the clock or internal oscillator CLK1.

After storage of the reference value contained in the counter included in the physical interface circuit 18 in the register 94a (step $U_3$), the method includes a step of transmitting a data frame containing the reference value stored in this register (step $U_4$).

The reference value denoted N(tA) is transmitted with the data frame whose start of transmission corresponds to the reference moment denoted tA.

In accordance with step $U_5$, the variable i is incremented by one unit and the transmitting node A then awaits a new reference moment $t_A'$ (step $U_2$).

In a similar fashion to what was described with reference to FIG. 1, the transmission step is effected by the radio equipment consisting of the elements 28, 30 and 32 of node A, whilst the reception step at node B uses the elements 46, 48 and 50 of said node B.

In the node B, a counter included in the physical interface circuit 36 is incremented continuously with the clock signal H2 issuing from the internal oscillator or clock CLK2.

The size of this counter is K bits and its period therefore equal to $2^K$.

After the step $V_1$ of initialisation of a variable i to 0 (FIG. 6b), each time a reference moment is determined (step $V_2$) and a reference event is generated as indicated above, a reference value representing this reference event is stored in the register 98a (step $V_3$) of the temporary storage means 98 of FIG. 5.

The method according to the invention implemented at the receiver (node B) makes provision, in accordance with step $V_4$ (FIG. 6b), for an operation of verifying the reception of the content of the register 94a by the node B.

On the assumption that the node B receives the content of this register 94a, then step $V_4$ is followed by a step $V_5$ during which the difference $\Delta(i)$ between the reference values or number of clock pulses contained in the registers 94a of FIG. 6a is formed.

This difference constitutes an item of information representing the difference between the reference moments tA identifying the start of transmission of the frame i at the node A and the reference moment tB identifying the moment of generation of a reference event based on the start of reception of the frame i at the node B.

This information constitutes an item of information within the meaning of the invention.

This first item of information represents a shift between the clocks CLK1 and CLK2 which is saved in the register 98b of the temporary storage means 98.

If no shift has been calculated before, the variable i is then equal to zero (step $V_6$) and this shift constitutes a reference shift denoted $\Delta(0)$, which will be used subsequently, at the time of determination of the correction necessary for synchronising the clocks with each other.

In accordance with step $V_7$ of the method (FIG. 6b), the shift $\Delta(0)$ is stored in the register 98c of the temporary storage means 98.

Step $V_7$ is then followed by step $V_8$, during which the variable i is incremented and the receiving node B awaits a new reference event in accordance with step $V_2$.

Conversely, if it is not the case of first calculated shift (i different from 0), then the shift which has just been calculated $\Delta(i)$ is compared with the reference shift $\Delta(0)$ (step $V_9$).

In accordance with this case, the difference $\Delta(0)$ (N(tB)−N(tA)) constitutes a first item of information within the meaning of the invention and the difference $\Delta(i)((N(t_B^{(i)})-N(t_A^{(i)}))$ constitutes a second item of information.

The difference between the first and second items of information ($\Delta(0)$ and $\Delta(i)$) is made by the CPU 40 of the node B and makes possible detection of any deviation between the internal oscillators or clocks CLK1 and CLK2.

This difference between the first and second items of information supplies the number of deviation clock pulses between the internal oscillators or clocks CLK1 and CLK2 between the two reference moments.

This value of the deviation is then added to the value contained in the register 98d (step $V_{10}$) of the temporary storage means 98.

This register contains the total of the deviations measured previously between the two clocks CLK1 and CLK2.

The content of the register 98d represents the correction that is to be made to the clock signal H2 in order to be synchronised with respect to the clock signal H1.

Step $V_{10}$ is then followed by step $V_8$, during which the variable i is incremented and, in accordance with what has already been stated above, the receiver (node B) awaits a new reference moment (step $V_2$).

Returning to step $V_4$, if the test carried out during this step shows that the node B has not received the content of the register 94a, this means for example that the corresponding data frame denoted i is lost or incorrectly received.

In this case, the receiver (node B) awaits the following reference event (steps $V_{11}$, and $V_{12}$) in order to store a new reference value contained in the counter included in the physical interface circuit 36 and corresponding to the following reference moment (step $V_3$).

It will be noted that FIG. 7 supplies a table indicating, for different data frames i transmitted from node A to node B, with i=0, 1, . . . , 7, . . . , the different reference moments $t_A$, $t_B(t_A^{(0)}, t_B^{(0)})$, $t_A'$, $t_B'$, ..., $t_A^{(7)}$, $t_B^{(7)}$, ... and the reference periods considered with respect to the given reference moments.

Advantageously, in this second embodiment of the invention, the loss of a data frame or the fact that the latter is incorrectly received does not prevent, as is the case with the first embodiment, the detection of the deviation between the clocks CLK1 and CLK2.

This happens because the table in FIG. 7 indicates that the reference periods are considered, for frames i=0 and i=1, between the reference moments $t_A$ and $t_A'$ (node A), $t_B$ and $t_B'$ (node B), for frames i=1 and i=2, between the reference moments $t_A'$ and $t_A''$ (node A), $t_B'$ and $t_B''$ (node B).

On the other hand, it will be noted that the reference value $N(t_A^{(3)})$ corresponding to the reference moment $t_A^{(3)}$ is not received by node B, the corresponding field of the frame i=4 being for example affected by a transmission error.

To correct this, the reference period under consideration can take into account not this reference moment but the following one: $t_A^{(4)}$.

Thus the reference period under consideration is defined between times $t_A''$ and $t_A^{(4)}$ (node A) and between times $t_B''$ and $t_B^{(4)}$ (node B).

In this case, the items of information compared with each other for this reference period will be $N(t_B'')-N(t_A'')$ and $N(t_B^{(4)})-N(t_A^{(4)})$.

This amounts to increasing the reference period in order to take account of any deviations which have occurred between the reference moments $t_A''$ and $t_A^{(4)}$.

Thus the correction related to the reference moment $t_A^{(3)}$ will automatically be taken into account at the next calculation, even if the data frame transmitted i=4 were to contain errors.

By virtue of the second embodiment of the invention, no information on the deviation between the clocks CLK1 and CLK2 is lost.

Likewise, according to the table in FIG. 7, if the reference moment $t_B^{(5)}$ is lost and if the node B cannot decode the reference values corresponding to the reference moments $t^{A(5)}$ and $t_A^{(6)}$ then the reference period under consideration will be extended and defined between the times $t_A^{(4)}$ and $t_A^{(7)}$ (node A) and $t_B^{(4)}$ and $t_B^{(7)}$ (node B).

As a variant, it will be noted that the fact of transmitting, not as indicated with reference to FIGS. 1 to 4 a first item of information $N(t_A')-N(t_A)$ representing the period between the reference moments tA and $t_A'$ from node A to node B, but solely the reference values $N(t_A)$ and $N(t_A')$, from node A to node B, also makes possible, at the node B, to determine the information $N(t_A')-N(t_A)$ at node B and to compare this with the other information also determined at the node B, $N(t_B')-N(t_B)$, in order to result in the same conclusions as description of the first embodiment of the invention.

It will be noted that $N(t_B')-N(t_A')-(N(t_B)-N(t_A))$ is equal to $N(t_B')-N(t_B)-(N(t_A')-(N(t_A))$, which shows that the two embodiments lead to the same deviation calculation.

It will be noted that, using the results obtained in the table of FIG. 7, which are therefore available at node B, all possible calculations between the different reference values contained in this table can be envisaged.

Moreover, the invention makes possible to check the synchronisation between the clocks of nodes A and B even if the data frames have variable duration.

It should be noted that, with regard to the optimisation of the size of the different registers and notably the registers 98a, 98b, 98d, everything stated during the description of the first embodiment remains valid for this second embodiment.

Notably, the optimisation of the size of these registers and particularly of the register 94a is important since it defines the bandwidth necessary for the radio transmission.

The diagram of FIG. 4 concerning the correction method applied to the clock signal H2 in order to synchronise it with respect to the clock signal H1 remains valid for the second embodiment and will therefore not be described again.

It should be noted that the present invention makes possible to check the synchronisation of several nodes connected to different serial connection buses with respect to a "Master" node where the latter is capable of broadcasting information to the nodes to be synchronised.

This applies more particularly when the nodes communicate with each other by radio or optical link.

It should also be noted that, in a communication network according to the invention, it is possible to provide for a network node that is dedicated to generating a reference event common to all the nodes. The existence of this node makes possible to use the invention when the two nodes to be synchronised cannot generate reference events by themselves.

We will now describe with reference to FIGS. 8, 9, 10, 11a, 11b and 11c the generation of the reference event at a reference moment on receiver side within the meaning of the invention and which is related to the reception of data transmitted by node A of FIGS. 1 and 5.

FIG. 8 is a detailed view of modem 46 of FIGS. 1 and 5 of the receiving node or device of reception B of FIG. 1. In regard to FIG. 8, after being amplified, filtered and transposed in frequency by the radio unit 48 of FIGS. 1 and 5, the signal is transmitted to the digital to analog converter 301. The radio signal is, in a known way, an OFDM signal carrying OFDM symbols. Such a signal is based on a distribution of the signal to be transmitted on a great number of carriers in parallel, individually modulated with low bit rate. As the bit rate is low, the bandwidth necessary for each carrier is small, and thus, it is more probable that the characteristics of amplitude and phase will be identical for all the frequencies constituting this band. This technique is known under the name of Orthogonal Frequency Division Multiplexing. Indeed, the spectra of the signals modulating the carrier overlap in a such way that they check the condition of orthogonality which makes it possible to eliminate the interferences between modulated subcarriers and to obtain a much larger spectral efficiency.

The spacing between two adjacent subcarriers corresponds to the reverse of the duration of a symbol.

Modulation OFDM is generally understood as a Fourier transform, so that we use for its implementation the algorithms of Fast Fourier Transform.

We remind hereafter the principal steps carried out during the emission of one message using an OFDM modulation.

First of all, we group the binary data of the message to transmit into blocks of data. Each of these blocks will be transmitted independently and will constitute, after modulation in base-band, an OFDM symbol.

Each block of data groups also the binary characters by subset, each subset is mapped in an objective way on a discrete set of points in Fresnel's space, each one of these points representing a possible phase and amplitude. Thus, for example, if we consider a message made of the following sequence of bits: {00001110010001111000 . . . }, we can extract a block from it from 16 bits 0000111001000111, which we associate, by mapping, the following set of points of the complex plan: 1+j, 1+j, −1 j, 1-j, −1+j, 1+j, −1+j, 1−j. There is thus a set of eight complex elements, defining a vector V.

Then we apply to the vectors V thus obtained from the original message a discrete inverse fast Fourier Transform of matrix A, which provides an OFDM symbol, made of a succession of complex amplitudes.

Each transmitted symbol is received, after passage in the transmission channel, by a demodulator, of which we extract a vector V' containing complex elements by multiplying the amplitudes constituting this symbol by a discrete direct Fourier transform matrix A', such as A.A'=I, where I indicates the identity matrix.

The application of a decision criterion based on the maximum likelihood is made on the real part and the imaginary part of each vector V', makes it possible to find the initial sequence of symbols, and then to restore the associated binary characters.

The various symbols of each block are dependent on each other thanks to the linear combination obtained by multiplying the elements of a vector V to be transmitted by the discrete inverse Fourier transform matrix A. This linear combination guarantees a certain robustness and protects the symbols against the interference between complex symbols inside the same OFDM symbol.

On the other hand, this protection effect does not extend from an OFDM symbol (i.e. of a block of complex symbols) to the other.

In order to avoid the interferences between blocks, it is known to use a technique which consists in setting one duration of silence or not-emission or re emission of already sent symbols, also called guard time, between two consecutive symbols.

This analog OFDM signal transmitted to the modem 46 comprises intervals of guard, pilot subcarrier and carrier modulated by data. The interval of guard of each OFDM symbol is usually built at the emission by the copy at the end of OFDM symbol of a certain number of samples placed at the head of the aforesaid OFDM symbol.

In this example of embodiment, the radio signal has a structure of radio frames comprising header data or preamble and data known as useful or data frame represented by OFDM symbols.

The analog to digital converter 301 of FIG. 8 converts the signal received into a digital signal at the sampling rate of clock 314. The digital sampled data thus obtained are transmitted to a start frame detection unit 302 by a bus 311, and to a buffer memory MEM_TAMPON 304 which is for example a shift register, to which a synchronization unit 303 will access.

The start frame detection unit 302 given rhythm by a clock 314 detects the presence or not of a frame by detecting or not the presence of a specific data F in our case start of the frame of information among the sampled data. This unit detects, not in real time, according to a method of correlation, known of the skilled man of the art, a peak of correlation corresponding to the effective start of the frame and more precisely the start of preamble with a delay Δs. This delay Δs is not constant because of inaccuracy of this detection for certain radio channels.

The step of correlation is carried out from the samples previously written in the buffer MEM_TAMPON 304. The unit of detection of start of frame 302 thus reads these samples by means of bus 311 in this memory MEM_TAMPON 304 starting from an address 0 to an address Ne-1. This correlation is realized each time that a new sample is loaded in the MEM_TAMPON 304. Each new sample is written at the address 0 of this memory. When a new sample is written in memory MEM_TAMPON 304, all the other samples are written in the following address (increment of 1 of the address) and, if memory MEM_TAMPON 304 is full, the oldest sample is lost.

The result of the correlation is compared with a predetermined threshold to carry out a good compromise between the probability of a false alarm and a miss of detection of an existing frame. The last sample taken into account in the calculation of correlation for which the threshold was exceeded is taken as moment of detected start of preamble and a signal of start of frame 309 is sent at this moment to a unit of synchronization of OFDM symbols noted 303.

This last sample constitutes, within the meaning of the invention, a specific data F among the sampled data.

The moment of detection of start of frame corresponds in fact to the moment of appearance of the specific data F and identifies the position of this last among the other data.

It should be noted that the detection of the moment of appearance of this specific data (start of frame) is not as precise as it would be wished and it is the case if a signal of "wake up" activates and initializes the analog to digital converter 301 and the unit of detection of start of frame 302. In the same way, a signal of "sleep" deactivates the analog/digital converter 301 and the unit of detection of start of frame 302. These signals can be provided by an upper control layer or a circuit in the modem.

Thus, the analog/digital converter 301 and the detection unit of start of frame 302 are active during a limited interval of time corresponding to a number of samples noted Nlisten each Nburst samples, so that the receiving node B can be able to listen, in a cyclic way, if the transmitting node A tries to transmit another signal.

The purpose of this is to save energy at the receiver level. The numbers of samples Nburst and Nlisten are given according to the needs for the communication system. As long as the receiving node receives data of a frame which was destined to it, the sleep signal is not taken into account. When on the other hand the receiving node does not receive any more data belonging to the frame, the analog/digital converter 301 and the unit of detection of start of frame 302 are de-activated at the end of certain time, noted TL, determined according to the needs for the system.

If the energy supply is sufficient, it can be considered to maintain the analog/digital converter 301 and the unit of detection of start of frame 302 is active permanently.

The unit of synchronization of OFDM symbols 303 is activated at the reception of the signal of start of frame detection 309. The unit 303 sends an index of synchronization IS 313 to the memory MEM_TAMPON 304 which points on an address in the memory 304. The unit 303 also sends a signal of start of fine synchronization 310 and one signal containing the predetermined parameters of equalization 315 to the unit of fine synchronization 305. Moreover, the unit 303 delivers a signal of reference 64, which will allow, in a very accurate way, to provide one reference moment to the upper layer (CPU 40).

A detailed description of the unit of synchronization of OFDM symbols will be done later on in reference on FIG. 9.

The unit of synchronization of OFDM symbols 303 receives a sampling clock signal 319 coming from the sampling clock 314.

When the memory MEM_TAMPON 304 receives a new index signal IS 313, it makes available to the reading for the unit of fine synchronization 305 the N samples from address IS with IS+N−1.

Unit 303 makes possible to obtain the position, in the first OFDM symbol of the frame, of a point of synchronization which is distant at more than one half period of the sampling clock 314 from the ideal point of synchronization.

In this unit of synchronization of OFDM symbols 303, we proceed within the scope of the invention, to the detection, among sampled data, of one moment of appearance of at least a specific data E which corresponds, in this case to the last sample of data of first symbol OFDM of the data transmitted into the frame. This moment follows the moment of start of frame (moment of appearance of the other specific data F) and brings a higher degree of accuracy in the detection of the moment of appearance of the specific data E than the precision obtained during the detection of the moment of appearance of the specific data F. The detection of such moment of reference is the reference event corresponding to the start of the data frame in a frame of information made of a preamble part and a frame of data. This will make possible to refine the precision with which the reference event is given within the meaning of the invention.

The moment of appearance of that sample identifies its position among all the samples of the frame.

This unit 303 implements, within the meaning of the invention, a correlation of the data sampled in the frequency domain after having carried out on these data a fast Fourier transform.

It should be noted that the correlation could also be carried out in the temporal domain.

The unit of fine synchronization 305 also carries out a Fast Fourier Transform noted FFT of size N on the received samples and corrects eventually the output of its FFT by using the above mentioned signal containing predetermined parameters of equalization 315. This type of equalization is classical and known by a skilled man of the art. The samples are then known as equalized samples.

Fine synchronization consists to calculate a fractional time $\tau^*$ maximizing the correlation between the reference sequence of pilot sub carrier and the equalized samples corresponding to pilot sub carriers.

An implementation of this technique is known and described in patent U.S. Pat. No. 5,444,697.

A phase equal to $\omega_i \tau^*$ is added to the phase of each equalized sample, where $\Omega_i$ is the pulsation of the i Th sub carrier.

The unit of fine synchronization implements, within the meaning of the invention, a correlation that refines the precision obtained with the unit 303 on the detection of the moment of appearance of the specific data E (position of a sample of a OFDM symbol).

Then, the equalized and synchronized samples are provided to a unit 306 which converts complex symbols into binary data. The binary data then are de-interleaved and decoded in blocks 307 and 308 in the case where, with the emission, the data had been coded and interleaved. Finally, modem 46 provides data correctly demodulated, de-interleaved and decoded on bus 52 (FIGS. 1 and 5).

As previously mentioned, FIG. 9 is a detailed view of the unit of synchronization of OFDM symbols 303 of modem 46 of the receiving node or device B.

The unit of synchronization of OFDM symbols 303 comprises a module of fast Fourier transform FFT 321. The module of FFT 321 makes a fast Fourier transform on a number of N provided samples. The outputs of the FFT 321 module are complex symbols. N is the number of consecutive samples of OFDM symbols without intervals of guard and also represents the number of subcarriers of one OFDM symbol.

The unit of synchronization of OFDM symbols 303 comprises a counter of samples 320. The counter of samples 320, since it is activated, counts the impulses or samples of the sampling clock 314. This counter 320 is initialized with value 0.

It will be used to monitor the amount of samples between the start of frame detection and the moment where the reference event will be generated for upper layers. The unit of synchronization of OFDM symbols 303 comprises a processing unit 318, which is for example a microprocessor. This processing unit 318 implements an algorithm whose flow chart is represented on FIG. 10 by using the various signals, memories and units available at the level of the unit of synchronization of symbols 303.

The unit of synchronization of OFDM symbols 303 comprises a unit of inputs/outputs E/S noted 322 allowing the access to bus 311, the reading of the signal of start of frame detection 309, the generation of the signal of start of fine synchronization 310, the generation of the index of synchronization 313, the generation of the signal of reference 64, the transmission of a signal containing the predetermined parameters of equalization 315, and the reception of the sampling clock signal 319.

The unit of synchronization of OFDM symbols 303 contains a read-only memory 316 with memory areas MEM_Δ, MEM_N, MEM_G, MEM_P, MEM_offset, MEM_X, MEM_k, MEM_SEQ, MEM_EGA.

MEM_EGA is a memory area made up of N zones containing each one a predetermined parameter of correction of phase and amplitude, called parameter of equalization. Each of these N parameters of equalization is intended to correct the amplitude and the phase of each different subcarrier of the OFDM symbol, which comprises N subcarriers.

Each subcarrier corresponds to a complex symbol of one of the outputs of the FFT module 321. A complex symbol is represented by a value of amplitude and phase.

The N parameters of equalization of the memory area MEM_EGA are data of equalization intended to compensate the known distortions caused by the circuits of transmitting node A and of the receiving node B. The use of these parameters of equalization is known for a skilled man of the art.

MEM_SEQ is a memory area with P registers containing each one a complex symbol of predetermined phase and amplitude corresponding to a pilot subcarrier. MEM_SEQ thus contains a sequence of reference of the pilot subcarriers in the form of complex values. Each one of the P registers of the memory area MEM_SEQ thus represents the amplitude and the phase of the complex symbol used at the emission for the modulation of a pilot subcarrier different among the P pilot subcarriers which OFDM symbol contains.

MEM_Δ corresponds to a predetermined delay between the moment of appearance of the first OFDM symbol of data (due to writing of the last sample of this first symbol in memory) and the sending of the signal of reference 64. This delay is higher than the maximum theoretical time necessary for the detection, among the sampled data of first OFDM symbol, of the moment of appearance of the specific data E, i.e. last sample of this first OFDM symbol.

The read-only memory 316 also comprises a memory area PROG in which the various instructions or steps of the data-processing program based on the algorithm previously mentioned are contained.

The unit of synchronization of OFDM symbols 303 also comprises a RAM memory 317 with memory zones MEM_CORR, MEM_SYNC, MEM_EGP, MEM_m, MEM_P, MEM_i, MEM_MAX, MEM_iMAX, MEM_ind.

MEM_CORR is a 2 columns table containing the results of the correlation carried out by the processing unit 318 as well as its associated index. This index represents the number of new samples from the first correlation carried out during the synchronization of concerned OFDM symbol.

MEM_SYNC is a 2-column table containing the indices of the peak of correlation of each OFDM symbol as well as the corresponding index of each OFDM symbol. First received OFDM symbol has as an index 0 and sth received OFDM symbol has as an index s−1.

The unit of synchronization of OFDM symbols 303 comprises in addition a data bus 323 connecting between them the input output unit 322, the read-only memory 316, the RAM memory 317, the module of FFT 321, the counter of samples 320, and the processing unit 318. It should be noted that the purpose of the counter of samples 320 is to monitor the time elapsed between the start of frame detection and the detection of a predetermined event.

FIG. 10 is a detailed flow chart of the instructions or steps carried out by the unit of synchronization of OFDM symbols 303 of modem 46 in the reception node or device B, and eventually of the unit of detection of start of frame 302, in accordance with the process of determination of reference related to the reception of data according to the invention.

The unit of synchronization of OFDM symbols 303 constitutes, within the meaning of the invention, a device for generating a reference moment related to the reception of data.

The unit of determination of reference moment related to the reception of data can also include, in another embodiment, the unit of detection of start of frame 302 and be represented by block 340 in FIG. 8, when the invention also includes the step of detection of the moment of appearance of the signal of start of frame.

The processing unit 318 carries out the various instructions of the algorithm. At step E200, the unit of synchronization of OFDM symbols 303 is activated when it receives a signal of start of frame detection 309 and goes to step E201.

At the step E201, the processing unit 318 awaits a predetermined number X of clock pulses coming from the sampling clock 314, then goes to the following step E203.

This predetermined number X is a number sized according to the system and in particular of the structure of the received frame of data. X is a value read in read-only memory at the address MEM_X by the processing unit 318.

Between the moment of detection of the start of frame and the moment when memory MEM_TAMPON 304 contains all the samples of first OFDM symbol to be synchronized, there can be a great amount of pulse clock 314 and it is not necessary to immediately start the procedure of synchronization of symbols OFDM. This explains the interest to await a number X of clock pulses of sampling clock 314.

During the wait time equal to a number X of clock pulses, some receiver's parameters could be modified to improve quality of reception.

Based on information carried by the samples received between the detected frame start and the end of the wait time, a hardware circuit or a software algorithm could tune for instance a receiver's local oscillator to the right frequency. The samples comprised between the detected frame start and the end of the wait time are samples that are part of what is generally called preamble by a skilled man of the art. This is a second advantage of wait time of a number X of clock pulses of sampling 314.

We consider here by "synchronizing" the fact of making available the reading for the fine synchronization unit 305 only the N samples belonging to OFDM symbol. This is carried out by providing an index of synchronization IS 313 to the MEM_TAMPON 304.

At step E203, the counter of samples 320 is activated and current value "Nc" of this counter 320 is initialized to 0.

The variables m, p, i, max, imax, ind, sync corr contained in MEM_m, MEM_P, MEM_i, MEM_MAX, MEM_iMAX, MEM_ind, MEM_SYNC, MEM_CORR are also initialized to 0. With each impulse provided by the sampling clock 314, value "Nc" of the counter of samples 320 is incremented of 1 unit.

At step E204 of the algorithm, the processing unit 318 reads in the RAM memory 317 the variable m, where m is the number of samples into one symbol, i and value Nc at the output of counter 320 and carries out calculation Nc−m.

If the result of this calculation Nc−rn is positive or null and if i is null, the processing unit 318 goes to the step E205.

If result Nc−m is strictly negative or if i is not null, the processing unit 318 again carries out the tests at the time of the next clock pulse of sampling clock 314.

The algorithm comprises a step E205, where the processing unit carries out calculation Nc−m−i and writes the result "ind" in the RAM memory with the MEM_ind address.

This unit starts at the following step E206 the reading and the processing by the module of Fourier transform 321 of N samples, N stored in ROM memory, of data read starting from the address ind until ind+N−1 in memory MEM_TAMPON 304, by means of bus 323, the unit of inputs/outputs 322 and bus 311.

The processing unit 318 reads in read-only memory in MEM_P, the number and the position of the pilots of OFDM symbol among the N subcarriers. Thus, the processing unit 318 reads a number P of predetermined output results from the module of FFT 321 among the N output results.

The number P is the number of pilot subcarriers of OFDM symbol. A pilot subcarrier is, firstly, a subcarrier for which the receiver knows the position in the field of the frequencies compared to all the other subcarriers of OFDM symbol and, secondly, a subcarrier which was modulated at the emission by a complex symbol of amplitude and phase known by the receiver.

The P predetermined output results of the module 321 are the output results on which should be the complex symbols corresponding to those of the pilot subcarriers if, in entry of the module of FFT 321, the N samples read are those of same OFDM symbol.

The processing unit 318 reads the parameters of equalization in the memory area MEM_EGA with the P registers corresponding to the pilot subcarriers. Unit 318 applies these last parameters of equalization to the P predetermined output results of the module of FFT 321 according to a method known by a skilled man of the art in order to obtain a number P of complex symbols that is equalized whose amplitude and phase aren't affected by the distortions generated by the transmission channel.

The processing unit 318 writes in a zone MEM_EGP of the RAM memory 317 the values of the P equalized complex symbols. Then the processing unit 318 goes to the step E207.

At step E207, with the sequence of P complex symbols in the memory register MEM_SEQ and the sequence of P equalized complex symbols in RAM memory, the processing unit 318 carries out then an operation of classical correlation between these two last sequences and writes in the 2 columns table MEM_CORR of the RAM memory the result of this correlation as well as variable i associated on the same line. The processing unit 318 goes to the step E208.

At step E208, the processing unit 318 reads variable i in memory, the value noted Maxcorr in a memory area MEM_MAX and reads in table MEM_CORR the value of correlation corresponding to the variable i and noted Corr(i). If the value of Corr(i) correlation is higher or equal to Maxcorr, then the processing unit 318 goes to the step E209, if not it goes to the step E211.

At step E209, the value of correlation Corr(i) is stored in the memory area MEM_MAX, and i in the zone MEM_iMAX memory then goes to the step E210.

At step E210, the processing unit 318 increments of 1 unit i and then goes to the step E205.

If the value of Corr(i) correlation is not higher or equal to Maxcorr, then the step E208 is followed of a step E211.

At step E211, the processing unit 318 reads in table MEM_CORR the value of Corr(i) correlation corresponding to variable i, and reads in the read-only memory in the address MEM_k, the value of a noted variable k. k is defining the number of samples which are examined to determine whether the detected maximum was local or the true maximum.

By reliability we consider that once we reach a peak of convolution, the convolution result on following samples must decrease. If no, it means that we found a local peak that has not to be taken into account. As example k having a value of 5 can be a good compromise between accuracy and calculation speed. Also, the k first samples are considered too noisy, so a maximum on these samples has not to be taken in account.

If k is strictly higher than i then the processing unit 318 goes to step 212, it means that there are not enough samples to analyze and it is the beginning of the analysis.

If k is lower or equal to i, the processing unit reads in an iterative way in table MEM-CORR the value of correlation corresponding to the index going from 1 to k. Moreover, if for all the values of j, Corr(i−j) is strictly lower than Corr (i), then the processing unit goes to the step E215, if not it goes to the step E212. As previously mentioned, the purpose of this step is to check whether or not we have a local maximum which may generate errors.

At step E212, the processing unit 318 increments of 1 unit i, then goes to the step E205 already described above and correlation start again.

It should be noted that the steps E205 to E212 form a data-processing loop and correspond to a search for a maximum among the sampled data. This loop corresponds in fact to detection, among the sampled data, of the moment of appearance or the position of the specific data E mentioned above (last sample of first OFDM symbol).

At step E215, the processing unit 318 reads the index called hereafter S(p) corresponding to the peak of correlation of p+1th OFDM, m and p in the memory. p represents the index or the order of OFDM symbol in the frame. The first symbol on which one carries out the search of the peak of correlation has as an index 0. Then S(p) corresponds to the i value at the maximum of correlation of the concerned symbol.

The processing unit 318 writes in RAM memory at MEM_SYNC the result of calculation m+S(p) as well as the index p associated on the same line.

The processing unit 318 reads current value Nc of the counter of samples 320, calculates the difference Nc−m−S(p), then sends an index of synchronization IS 313 to the memory MEM_TAMPON 304 which points on the address having for value the result of this calculation. It should be noted that such calculation makes the difference between the amount Nc of counted clock pulses by counter 320, amount which represent the time elapsed during the start of the procedure and effective location of the event among samples.

The processing unit 318 also sends a signal of start of fine synchronization 310 to the unit of fine synchronization 305 of FIG. 8.

If p=0, the processing unit 318 reads a value noted Δ contained in the read-only memory and, calculates the sum Δ+S(0) and a signal corresponding to the reference event will be sent when the value of the counter of samples Nc is equal to the result of calculation Δ+S(0). This signal 64, also called reference event, is used as example in the FIGS. 1 and 2 as described in reference to these figures.

The value Δ corresponds to one duration which is selected so as to be higher than the maximum theoretical time necessary to detect, among the sampled data, the moment of appearance or the position of the specific data E or last sample of first OFDM symbol.

This value Δ is thus chosen so that the reference event tB, tB' resulting from this is not exceeded at the time when one wishes to record the value of reference N(tB), N(tB') corresponding at this reference moment which identifies the appearance of a reference event among the received sampled data.

Thus, errors generated by an inaccurate start of frame detection are removed. An accurate signal is then provided at a fixed delay.

The reference event is thus determined from the specific data E previously described.

The following steps perform normal function of the 303 and are not related to the detection of the event of reference at the first data symbol in the frame but the processing of other OFDM symbols of the data contained into the frame.

The processing unit 318 then goes to the step E213 during which this unit increments of 1 the value p which means next symbol is analyzed, then goes to the step E214.

At step E214, the processing unit 318 initializes variable i to zero and initializes the contents of table MEM_CORR to 0. The processing unit 318 calculates then p*(N+G)+S (0)-offset and writes the result of this calculation to the MEM_m address in the RAM memory. G stored in ROM memory at MEM_G, is the number of samples corresponding to the interval of guard interval of an OFDM symbol. "offset" is a small value intended to make calculation more reliable by providing a way to modify m value.

The step E204 then is carried out as described above again.

It should be noted that it could be interesting to carry out several steps of detection, among the sampled data, of the moment of appearance of several successive OFDM symbols.

Thus, each moment of appearance of a specific data identifies a position (for example the last sample) of a sample of data among all the samples of data of an OFDM symbol and this position is the same one in other OFDM symbols of the frame.

This position is of course given with more or less precision from an OFDM symbol.

It is thus possible to determine the relative position of these specific data the ones compared to the others within sight of the structure of the emitted frame of data, which in particular makes it possible to evaluate the disturbances affecting the radio channel of communication.

In reference to FIGS. 11a to 11c, we will now describe by some time charts, the detection and the generation of the reference event on receiver according to FIGS. 8 to 10.

FIGS. 11a to 11c show examples of such detection made by the unit of synchronization of OFDM symbols 303. In these figures, 910a, 910b, 910c represent the frame generated on transmitter. S index in the frame corresponds to the start of the information frame and E index is the first data of the data frame, information between S and E are what we call preamble.

These frames are transmitted through a radio link to the receiver.

Diagram 920a is an example of received frame by the receiver. Due to some attenuations of the radio channel or the characteristics of the demodulator 48, some information will have been distorted too much, and the start of the frame of information will be recognized as the sampled data.

Diagrams 920b and 920c are examples of other received frames by the receiver. In such case, no information in the preamble will have been distorted too much and F symbols in the frames 910b and 910c correspond to S symbol of frames 910b and 910c. It is easily understandable that the use of the start of the frame of information is not accurate enough for the synchronization of networks.

Once the start of the frame has been detected (step E200 of FIG. 10), the unit of synchronization of OFDM symbols 303 enters in a waiting state (step E201 of FIG. 10) where no correlation will be done. Such wait state is represented as 902a, 902b and 902c in FIGS. 11a to 11c.

Once such step has been made, the counter 320 will be initialized and activated. The value of the counter is described as example on 930a, 930b, 930c of FIGS. 11a to 11c. Such operation corresponds to step E203 of FIG. 10.

At that time each sampled data stored in memory 304 of the modem 46 will be correlated until the detection of the specific data E, which correspond to the start of the data frame. Such correlation will be made by steps E205 to E212.

940a, 940b and 940c correspond to the detection of such specific data E and represent S(0) content at that time.

It should be noted that correlation steps for one sample may need different processing time. In FIGS. 11a to 11c, processing time is different among samples. As example, the first correlated sample will need only one sampling clock sample but the seventh one on FIG. 11a, correlation will take in this example 3 clock samples.

Once the specific data E has been found, the CPU 318 add S(0) value to a specific delay, which is in our example equal to 20.

Once the counter 320 of the FIG. 9 will reach such value, the reference event 950a, 950b, 950c are generated.

These operations are made on step E215 of the FIG. 9.

As previously mentioned, the invention is not sensible to inaccurate start of frame of information detection as shown in FIGS. 11a and 11b.

The invention is also insensible to processing time variations for the correlation as we can see in FIGS. 11b and 11c.

The invention avoids also any problem generated by long computing time by generating a delayed reference event signal.

According to another embodiment of the invention, shown in FIG. 12, the OFDM symbols synchronization unit 303 can perform the generation of a reference event in a simplified way as flowchart described in FIG. 10.

On FIGS. 12a and 12b, we have two examples of transmitted frames 1000a and 1000b and two received frames 1020a and 1020b.

At the detection of a start of frame, noted F in both received frames 1020a and 1020b, the unit of synchronisation of OFDM symbols 303 is activated once it receives a signal of start of frame detection 309 and goes to step E201.

At the step E201, the processing unit 318 awaits, shown FIGS. 12a and 12b by 1025a and 1025b, a predetermined number X of clock pulses coming from the sampling clock 314, then goes to the following step E203.

Once this waiting period has been completed, the search of the specific data E starts. At first, at step E203, the counter of samples 320 is activated and current value "Nc" of this counter 320 is initialized to 0.

In this embodiment, it is assumed that the receiver, and especially the unit of synchronisation of OFDM symbols knows the theoretical number of sampled data of the preamble part of the Frame.

The variables m, p, i, max, imax, ind, sync corr contained in MEM_m, MEM_P, MEM_i, MEM_MAX, MEM_iMAX, MEM_ind, MEM_SYNC, MEM_CORR are also initialized to 0. With each impulse provided by the sampling clock 314, value "Nc" of the counter of samples 320 is incremented of 1 unit.

At step E204 of the algorithm, the processing unit 318 reads in the RAM memory 317 the variable m, where m is the number of samples into one symbol, i and value Nc at the output of counter 320 and carries out calculation Nc−m.

If the result of this calculation Nc−m is positive or null and if i is null, the processing unit 318 goes to the step E205.

If result Nc−m is strictly negative or if i is not null, the processing unit 318 again carries out the tests at the time of the next clock pulse of sampling clock 314.

The algorithm comprises a step E205, where the processing unit carries out calculation Nc−m−i and writes the result "ind" in the RAM memory with the MEM_ind address.

This unit starts at the following step E206 the reading and the processing by the module of Fourier transform 321 of N samples, N stored in ROM memory, of data read starting from the address ind until ind+N−1 in memory MEM_TAMPON 304, by means of bus 323, the unit of inputs/outputs 322 and bus 311. This corresponds to the first symbol to be processed. In FIGS. 12a and 12b, it corresponds to symbols marked as 1.

The processing unit 318 reads in read-only memory in MEM_P, the number and the position of the pilots of OFDM symbol among the N subcarriers. Thus, the processing unit 318 reads a number P of predetermined output results from the module of FFT 321 among the N output results.

The number P is the number of pilot subcarriers of OFDM symbol. The P predetermined output results of the module 321 are the output results on which should be the complex symbols corresponding to those of the pilot subcarriers if, in entry of the module of FFT 321, the N samples read are those of same OFDM symbol.

The processing unit 318 writes in a zone MEM_EGP of the RAM memory the 317 values of the P equalized complex symbols. Then the processing unit 318 goes to the step E207.

At step E207, with the sequence of P complex symbols in the memory register MEM_SEQ and the sequence of P equalized complex symbols in RAM memory, the processing unit 318 carries out then an operation of classical correlation between these two last sequences and writes in the 2 columns table MEM_CORR of the RAM memory the result of this correlation as well as variable i associated on the same line. The processing unit 318 goes to the step E208.

At step E208, the processing unit 318 reads variable i in memory, the value noted Maxcorr in a memory area MEM_MAX and reads in table MEM_CORR the value of correlation corresponding to the variable i and noted Corr(i). If the value of Corr(i) correlation is higher or equal to Maxcorr, then the processing unit 318 goes to the step E209, if not it goes to the step E211.

At step E209, the value of correlation Corr(i) is stored in the memory area MEM_MAX, and i in the zone MEM_iMAX memory then goes to the step E210.

At step E210, the processing unit 318 increments by 1 unit i. According to this second embodiment, the CPU 318 reads the value of the counter 320 and calculates the number of clock samples occurred during the processing of the first symbol. If this number is lower than a predetermined value, CPU 318 will wait until the counter 320 indicates a number of clock samples equal to the predetermined value. By such way, the processing of symbol will be constant anytime. As described in FIGS. 12a and 12b, the processing time for each data is equal, and does not vary like previous embodiment. The predetermined value of clock samples is set by choosing the longest processing for one symbol. Such operation effected, CPU 318 goes to the step E205.

If the value of Corr(i) correlation is not higher or equal to Maxcorr, then the step E208 is followed of a step E211.

At step E211, the processing unit 318 reads in table MEM_CORR the value of Corr(i) correlation corresponding to variable i, and reads in the read-only memory in the address MEM_k, the value of a noted variable k. k is defining the number of samples which are examined to determine whether the detected maximum was local or the true maximum.

If k is strictly higher than i then the processing unit 318 goes to step 212, it means that there are not enough samples to analyze and it is the beginning of the analysis.

If k is lower or equal to i, the processing unit reads in an iterative way in table MEM_CORR the value of correlation corresponding to the index going from 1 to k. Moreover, if for all the values of j, Corr(i−j) is strictly lower than Corr (i), then the processing unit goes to the step E215, if not it goes to the step E212. As previously mentioned, the purpose of this step is to check whether or not we have a local maximum which may generate errors.

At step E212, the processing unit 318 increments by 1 unit i, then goes to the step E205 already described above and correlation starts again. According to this second embodiment, the CPU 318 reads the value of the counter 320 and calculates the number of clock samples occurred during the processing of the first symbol. If this number is lower than a predetermined value, CPU 318 will wait until the counter 320 indicates a number of clock samples equal to the predetermined value. By such way, the processing of symbol will be constant anytime. As described in FIGS. 12a and 12b, the processing time for each data is equal, and does not vary like previous embodiment. The predetermined value of clock samples is set by choosing the longest processing for one symbol.

At step E215, the processing unit 318 compares i to the theoretical number of samples and will generate a reference event based according to the number of processed samples. In FIG. 12a, 6 data have been treated, and the theoretical number of data in preamble is 9. In FIGS. 12a and 12b, the maximum number of samples is set at 2 (for a better visibility of the figures), so a reference event will be generated after (9−6)*(2−1) clock samples after the specific data detection. It corresponds to the theoretical number of samples in preamble minus the number of processed samples the whole multiplied by the predetermined number of clock cycles for the process of one symbol minus 1. In FIG. 12b, no samples have been lost, the reference event generation occurs immediately. By such way, the generation of reference event will be done anytime at proper reference moment.

Thus, errors generated by an inaccurate start of frame detection are removed. An accurate signal is then provided at a fixed delay.

The reference event is thus determined from the specific data E previously described.

What is claimed is:

1. A method of generating a reference event in a receiving network node receiving frames of information from a transmitting network node, said method, executed when a frame of information is received, comprises the following steps:
   sampling the frame of information in order to form sampled data;
   processing the sampled data in order to detect from the sampled data a specific data;
   monitoring the number of processed sampled data until the detection of the specific data; and
   generating from the received frame of information the reference event on which the transmitting network node and the receiving network node must synchronize at a time dependent on the result of said monitoring step.

2. A method according to claim 1, wherein the frame of information is constituted of a preamble and a data frame.

3. A method according to claim 2, further comprising the step of detecting a start of the preamble.

4. A method according to claim 2, wherein the specific data is a start the data frame.

5. A method according to claim 4, wherein said processing step processes the sampled data until detection of the start of the data frame.

6. A method according to claim 1, further comprising the step of counting pulses of a sampling clock.

7. A method according to claim 3, further comprises the step of counting pulses of a sampling clock, wherein said processing step starts to process the sampled data at a predetermined number of clock pulses after detecting the start of the preamble.

8. A method according to claim 3, wherein said monitoring step starts to monitor the processed data at a predetermined number of clock pulses after detecting the start of the preamble.

9. A method according to claim 7, wherein said step of counting pulses of a sampling clock starts at the same time as said processing step.

10. A method according to claim 6, said step of generating the reference event includes:
    adding the number of monitored processed sampled data to a predetermined value; and
    generating the reference event when the counted sampling clock is equal to the result of said adding step.

11. A method according to claim 1, wherein the processing step includes:
    reading sampled data into a memory;
    making a Fast Fourier Transform from the read data;
    correlating the transformed data to a predetermined data; and
    detecting the specific data according to a result of said correlating step.

12. A method according to claim 11, wherein said correlating step includes:
    detecting the maximum value of correlation;
    memorizing information related to the maximum value of correlation; and checking if the correlation of next samples is lower than detected maximum value.

13. A method according to claim 1, said method further comprises the steps of:
reading information representing a second clock at the appearance of the reference event;
reading synchronization information inserted in the received frame;
calculating a difference between the information representing a second clock at the appearance of the reference event and the synchronization information; and
modifying the information representing the second clock according to the results of said calculation step.

14. A method according to claim 1, said method comprises further steps of:
reading information representing a second clock at the appearance of the reference event,
reading synchronization information inserted in the received frame,
calculating a difference between the information representing a second clock at the appearance of the reference event and the synchronization information; and
generating an information message on the network the node is connected to, the message containing information representing the results of said calculation step.

15. A method of synchronization between communication networks exchanging information by frames of information, each communication network having a clock and the number of clock pulses is monitored by a counter, said method comprises the steps of:
reading information representing the counted clock pulses of the clock of the first network at the appearance of a reference event;
inserting at least the information or calculated information on the basis of information into the frame of information as the synchronization information;
transferring the frame of information from a first network to a second network;
sampling the received frame of information in order to form sampled data;
processing the sampled data in order to detect from the sampled data a specific data;
monitoring the number of processed sampled data until detection of the specific data;
generating the reference event according to the result of said monitoring step;
reading information representing the number of counted clock pulses of the clock of the second network at the appearance of the reference event;
reading synchronization information inserted in the received frame of information from the first network;
calculating a difference between the information representing the number of counted clock pulses of the clock of the second network at the appearance of the reference event and the synchronization information; and
synchronizing the second network.

16. An apparatus for generating a reference event in a receiving network node receiving frames of information from a transmitting network node, the apparatus comprises:
sampling means for sampling the frame of information in order to form sampled data;
processing means for processing sampled data in order to detect from the sampled data a specific data;
monitoring means for monitoring the number of processed sampled data until the detection of the specific data; and
generating means for generating from the received frame of information the reference event on which the transmitting network node and the receiving network node must synchronize at a time dependent on the result from said monitoring means.

17. An apparatus according to claim 16, wherein the frame of information is constituted of a preamble and a data frame.

18. An apparatus according to claim 17, wherein said apparatus further comprises means for detecting a start of the preamble.

19. An apparatus according to claim 17, wherein the specific data is a start of the data frame.

20. An apparatus according to claim 19, wherein said processing means processes the sampled data until detection of the start of the data frame.

21. An apparatus according to claim 16, further comprising counting means for counting pulses of a sampling clock.

22. An apparatus according to claim 18, wherein said apparatus further comprises counting means for counting pulses of a sampling clock, wherein said processing means starts processing the sampled data at a predetermined number of clock pulses after detecting the start of the preamble.

23. An apparatus according to claim 18, wherein said monitoring means starts monitoring the processed data at a predetermined number of clock pulses after detecting the start of the preamble.

24. An apparatus according to claim 22, wherein, said counting means for counting pulses of a sampling clock starts counting at the same time as said processing means starts to process sampled data.

25. An apparatus according to claim 21, said generating means for generating the reference event comprises:
adding means for adding the number of monitored processed sampled data to a predetermined value; and
generating means for the reference event when the counted sampling clock equals to the result of adding means.

26. An apparatus according to claim 18, wherein said processing means comprises:
reading means for reading sampled data into a memory;
transforming means for making a Fast Fourier Transform from the read data;
correlating means for correlating the transformed data to a predetermined data; and
detecting means for detecting the specific data according to the result from said correlating means.

27. An apparatus according to claim 26, wherein said correlating means comprises:
detecting means for detecting the maximum value of correlation;
memorizing means for memorizing information related to the maximum value of correlation; and
checking means for checking if the correlation of next samples is lower than detected maximum value.

28. An apparatus according to claim 16, said apparatus comprises further comprises:
first reading means for reading information representing a second clock at the appearance of the reference event;
second reading means for reading synchronization information inserted in the received frame;
calculating means for calculating a difference between the information representing a second clock at the appearance of the reference event and the synchronization information; and modifying means for modifying the information representing the second clock according to the results of said calculation means.

29. An apparatus according to claim 16, wherein said apparatus further comprises:
  first reading means for reading information representing a second clock at the appearance of the reference event;
  second reading means for reading synchronization information inserted in the received frame;
  calculating means for calculating a difference between the information representing a second clock at the appearance of the reference event and the synchronization information; and
  generating means for generating an information message on the network the node is connected to, the message containing information representing the results from said calculating means.

30. A system of synchronization between communication networks exchanging information by frames of information, each communication network having a clock and the number of clock pulses is monitored by a counter, said system comprises
  first reading means for reading information representing the counted clock pulses of the clock of the first network at the appearance of a reference event;
  inserting means for inserting at least the information or calculated information on the basis of information into the frame of information as the synchronization information;
  transferring means for transferring the frame of information from a first network to a second network;
  sampling means for sampling the received frame of information in order to form sampled data;
  processing means for processing the sampled data in order to detect among from the sampled data a specific data;
  monitoring means for monitoring the number of processed sampled data until detection of the specific data;
  generating means for generating the reference event according to the result of said monitoring means;
  second reading means for reading information representing the number of counted clock pulse of the clock of the second network at the appearance of the reference event;
  third reading means for reading synchronization information inserted in the received frame of information from the first network;
  calculating means for calculating a difference between the information representing the number of counted clock pulses of the clock of the second network at the appearance of the reference event and the synchronization information; and
  synchronization means for synchronizing the second network.

31. A memory medium for storing a program to be executed in an apparatus for generating a reference event in a receiving network node receiving frames of information from a transmitting network node, said program comprising:
  code for sampling the frame of information in order to form sampled data;
  code for processing the sampled data in order to detect from the sampled data a specific data;
  code for monitoring the number of processed sampled data until the detection of the specific data; and
  code for generating from the received frame of information the reference event on which the transmitting network node and the receiving network node must synchronize at a time dependent on the result of said monitoring code.

32. A program stored in a memory medium in an apparatus for generating a reference event in a receiving network node receiving frames of information from a transmitting network node, said program comprising:
  code for sampling the frame of information in order to form sampled data;
  code for processing the sampled data in order to detect from the sampled data a specific data;
  code for monitoring the number of processed sampled data until the detection of the specific data; and
  code for generating from the received frame of information a reference event on which the transmitting network node and the receiving network node must synchronize at a time dependent on the result of said monitoring code.

33. An apparatus for generating a reference event in a receiving network node receiving frames of information from a transmitting network node, said apparatus comprises:
  a processor for sampling the frame of information in order to form sampled data, for processing sampled data in order to detect from the sampled data a specific data, for monitoring the number of processed sampled data until the detection of the specific data, and for generating from the received frame of information the reference event on which the transmitting network node and the receiving network node must synchronize at a time dependent on the result of the monitoring operation of said processor.

* * * * *

UNITED STATES PATENT AND TRADEMARK OFFICE
CERTIFICATE OF CORRECTION

PATENT NO. : 6,954,471 B1  
APPLICATION NO. : 09/597143  
DATED : October 11, 2005  
INVENTOR(S) : Samuel Rousselin et al.

It is certified that error appears in the above-identified patent and that said Letters Patent is hereby corrected as shown below:

COLUMN 1

Line 16, "contents" should read --contains--;  
Line 21, "activate" should read --activating--; and  
Line 40, "pulse" should read --pulses--.

COLUMN 2

Line 61, "pulse" should read --pulses--.

COLUMN 3

Line 3, "frame of informations," should read --frames of information,--; and  
Line 26, "pulse" should read --pulses--.

COLUMN 12

Line 60, "(steps $V_{11}$," should read --(steps $V_{11}$--.

COLUMN 13

Line 40, "$t^{A(5)}$" should read --$t_A^{(5)}$--;  
Line 41, "$t_A^{(4)}$ and $t_A^{(7)}$" should read --$t_A^{(4)}$ and $t_A^{(7)}$--; and  
Line 42, "$t_B^{(4)}$ and $t_B^{(7)}$" should read --$t_B^{(4)}$ and $t_B^{(7)}$--.

COLUMN 14

Line 42, "a such" should read --such a--; and  
Line 65, "plan: 1+j, 1+j, -1j," should read --plan: 1+j, 1+j, -1-j,--.

COLUMN 17

Line 24, "fast Fourier" should read --Fast Fourier--;  
Line 61, "fast Fourier" should read --Fast Fourier--; and  
Line 62, "fast Fourier" should read --Fast Fourier--.

COLUMN 19

Line 2, "MEM_P," should read --MEM_p,--.

UNITED STATES PATENT AND TRADEMARK OFFICE
CERTIFICATE OF CORRECTION

| | |
|---|---|
| PATENT NO. | : 6,954,471 B1 |
| APPLICATION NO. | : 09/597143 |
| DATED | : October 11, 2005 |
| INVENTOR(S) | : Samuel Rousselin et al. |

It is certified that error appears in the above-identified patent and that said Letters Patent is hereby corrected as shown below:

COLUMN 20

Line 11, "MEM_P," should read --MEM_p,--.

COLUMN 21

Line 47, "start" should read --starts--.

COLUMN 22

Line 5, "represent" should read --represents--.

COLUMN 23

Line 50, "event" should read --events--.

COLUMN 24

Line 5, "shown" should read --shown in--; and
    Line 18, "MEM_P," should read --MEM_p,--.

COLUMN 26

Line 48, "claim 6, should read --claim 6, wherein--.

COLUMN 27

Line 2, "detected" should read --the detected--;
    Line 3, "claim 1," should read --claim 1, wherein--;
    Line 14, "claim 1," should read --claim 1, wherein--; and
    Line 59, "node, the" should read --node, said--.

COLUMN 28

Line 28, "wherein," should read --wherein--;
    Line 32, "claim 21," should read --claim 21, wherein--;
    Line 56, "detected" should read --the detected--;
    Line 57, "claim 16," should read --claim 6, wherein--; and
    Line 58, "comprises (first occurrence)" should be deleted.

UNITED STATES PATENT AND TRADEMARK OFFICE
CERTIFICATE OF CORRECTION

| | |
|---|---|
| PATENT NO. | : 6,954,471 B1 |
| APPLICATION NO. | : 09/597143 |
| DATED | : October 11, 2005 |
| INVENTOR(S) | : Samuel Rousselin et al. |

It is certified that error appears in the above-identified patent and that said Letters Patent is hereby corrected as shown below:

COLUMN 29

Line 22, "comprises" should read --comprises:--; and
Line 41, "pulse" should read --pulses--.

Signed and Sealed this

Eighth Day of August, 2006

JON W. DUDAS
*Director of the United States Patent and Trademark Office*